United States Patent
Avital et al.

(10) Patent No.: US 10,951,391 B2
(45) Date of Patent: Mar. 16, 2021

(54) RANDOMIZED LOGIC AGAINST SIDE CHANNEL ATTACKS

(71) Applicant: Bar-Ilan University, Ramat-Gan (IL)

(72) Inventors: Moshe Avital, Jerusalem (IL); Itamar Levy, LeHavim (IL); Osnat Keren, Rosh HaAyin (IL); Alexander Fish, Tel-Mond (IL)

(73) Assignee: Bar-Ilan University

( * ) Notice: Subject to any disclaimer, the term of this patent is extended or adjusted under 35 U.S.C. 154(b) by 414 days.

(21) Appl. No.: 15/757,658

(22) PCT Filed: Sep. 6, 2016

(86) PCT No.: PCT/IL2016/050984
§ 371 (c)(1),
(2) Date: Mar. 6, 2018

(87) PCT Pub. No.: WO2017/037725
PCT Pub. Date: Mar. 9, 2017

(65) Prior Publication Data
US 2019/0028263 A1 Jan. 24, 2019

Related U.S. Application Data

(60) Provisional application No. 62/214,990, filed on Sep. 6, 2015.

(51) Int. Cl.
*G06F 11/30* (2006.01)
*G06F 12/14* (2006.01)
(Continued)

(52) U.S. Cl.
CPC .............. *H04L 9/003* (2013.01); *G06F 21/72* (2013.01); *G06F 21/755* (2017.08); *G09C 1/00* (2013.01);
(Continued)

(58) Field of Classification Search
CPC combination set(s) only.
See application file for complete search history.

(56) References Cited

U.S. PATENT DOCUMENTS 8,427,194 B2 * 4/2013 Deas ...................... H04L 9/003
326/8
10,164,768 B1 * 12/2018 Ramaraju ........ H03K 19/00315
(Continued)

FOREIGN PATENT DOCUMENTS

WO WO 2017/037725 3/2017

OTHER PUBLICATIONS

International Preliminary Report on Patentability dated Mar. 15, 2018 From the International Bureau of WIPO Re. Application No. PCT/IL2016/050984. (6 Pages).
(Continued)

*Primary Examiner* — Phy Anh T Vu

(57) ABSTRACT

A randomization element includes a logic input for inputting a logic signal, a logic output for outputting the input logic signal at a delay and a randomization element. The randomization elements introduces the delay between said logic input and said logic output and operates selectably in static mode and in dynamic mode in accordance with a mode control signal. A logic circuit may be formed with randomization elements interspersed amongst the logic gates, to obtain protection against side channel attacks by inputting a selected control sequence into the randomization elements.

24 Claims, 14 Drawing Sheets

(51) Int. Cl.
*H04L 9/00* (2006.01)
*G06F 21/72* (2013.01)
*G09C 1/00* (2006.01)
*G06F 21/75* (2013.01)

(52) U.S. Cl.
CPC ...... *H04L 2209/08* (2013.01); *H04L 2209/12* (2013.01)

(56) References Cited

U.S. PATENT DOCUMENTS

| | | | | |
|---|---|---|---|---|
| 10,691,836 | B2* | 6/2020 | Kose | G06F 21/81 |
| 2002/0158670 | A1* | 10/2002 | Alvandpour | H03K 19/0963 |
| | | | | 326/98 |
| 2003/0229597 | A1* | 12/2003 | de Jong | G06Q 30/018 |
| | | | | 705/72 |
| 2007/0211556 | A1* | 9/2007 | Kim | G11C 7/1078 |
| | | | | 365/230.08 |
| 2010/0095133 | A1* | 4/2010 | Peter | H04L 9/06 |
| | | | | 713/189 |
| 2011/0085662 | A1* | 4/2011 | Myers | H03K 19/17768 |
| | | | | 380/252 |
| 2011/0252244 | A1 | 10/2011 | Lesea et al. | |
| 2011/0285420 | A1* | 11/2011 | Deas | G06F 21/725 |
| | | | | 326/8 |
| 2012/0163585 | A1* | 6/2012 | Choi | H04L 9/002 |
| | | | | 380/28 |
| 2014/0013425 | A1* | 1/2014 | Samson | G06F 21/755 |
| | | | | 726/22 |
| 2014/0232432 | A1* | 8/2014 | Fish | G06F 30/00 |
| | | | | 326/104 |
| 2015/0349948 | A1* | 12/2015 | Kim | H04L 9/003 |
| | | | | 726/22 |
| 2017/0244546 | A1* | 8/2017 | Stark | H04L 9/002 |
| 2017/0262630 | A1* | 9/2017 | Teper | G06F 1/08 |
| 2017/0288652 | A1* | 10/2017 | Gu | H04J 3/047 |

OTHER PUBLICATIONS

International Search Report and the Written Opinion dated Dec. 25, 2016 From the International Searching Authority Re. Application No. PCT/IL2016/050984. (10 Pages).

Avital et al. "Randomized Multitopology Logic Against Differential Power Analysis", IEEE Transactions on Very Large Scale Integration (VLSI) Systems, 23(4): 702-711, Apr. 30, 2015. p. 2, Section II A, Section II B, Fig.2.

Bucci et al. "A Countermeasure Against Differential Power Analysis Based on Random Delay Insertion", IEEE International Symposium on Circuits and Systems, ISCAS 2005, May 23-26, 2005, p. 3547-3550, May 23, 2005.

Lu et al. "FPGA Implementation and Analysis of Random Delay Insertion Countermeasure Against DPA", IEEE International Conference on ICECE Technology, Field-Programmable Technology, FPT 2008, Dec. 8-10, 2008, p. 201-208, Dec. 27, 2009. Sections 2, 3.

Mentens et al. "Power and Fault Analysis Resistance in Hardware Through Dynamic Reconfiguration", International Workshop on Cryptographic Hardware and Embedded Systems, CHES 2008, LNCS 5154: 346-362, Aug. 10, 2008.

\* cited by examiner

RANDOMIZED LOGIC AGAINST SIDE CHANNEL ATTACKS

RELATED APPLICATIONS

This application is a National Phase of PCT Patent Application No. PCT/IL2016/050984 having International filing date of Sep. 6, 2016, which claims the benefit of priority under 35 USC § 119(e) of U.S. Provisional Patent Application No. 62/214,990 filed on Sep. 6, 2015. The contents of the above applications are all incorporated by reference as if fully set forth herein in their entirety.

FIELD AND BACKGROUND OF THE INVENTION

The present invention, in some embodiments thereof, relates to a logic circuit designed for protection against side channel attacks, and, more particularly, but not exclusively, to a method for operating such a logic circuit to protect against side channel attacks.

In the recent years the use of cryptographic devices storing secret and sensitive information has expanded and became essential in the communication area. Common uses for such cryptographic devices include secured: digital communications, credit cards transactions, smart cards, radio frequency identification (RFID) tags, and wireless sensor networks (WSN) communication. The importance of protecting cryptographic devices from many types of attacks has significantly grown. As a result, in addition to encryption algorithm implemented in the cryptographic devices and proved to be immune against mathematic/software attacks (linear or differential cryptanalysis), in most cases these devices also include security protection in additional layers of abstraction such as the physical implementation in order to handle different types of passive \active and invasive\non-invasive side-channels attacks.

In general, the cryptographic devices are vulnerable to many threats, such as tag tracking, jamming, blocking, cloning, and eavesdropping. Another significant and powerful threat to these devices is extracting the secret key by non-invasive SCA. SCA on cryptographic devices exploits unintentionally information leaks from physical channels, such as power consumption, electromagnetic emission, timing properties, etc. Power Analysis (PA) is a type of SCA which utilize the information that leaks from the power dissipation of a device on the processed information. Simple Power Analysis (SPA) uses a small number of measured power profiles for different system inputs (traces) whereas Differential and Correlation power analysis (DPA, CPA) attacks, which are considered more powerful, utilize information derived from very large no, of traces. The last two PA methods are based on the correlation between the instantaneous power consumed by the device and the processed data and exploit this correlation to extract the secret key. A distinct advantage of these attacks is that they do not require any information about the actual hardware implementation of the device only the functionality of the modules (as opposed to SPA).

Existing countermeasures against DPA/CPA attacks may be seen as falling into several orthogonal classes according to their abstraction level; i.e., the algorithmic, system, gate or device levels. Algorithmic/system approaches are mainly concerned in reducing the correlation between the operation performed and circuit activity, for instance by the addition of dummy operations, averaging the activities of the different processing steps, a randomization of crypto-operation execution, Blinding—random generation and masking of the data processed with random numbers using mathematical tools such as the exclusive-or operation. However, some of these methods may be vulnerable to higher-order DPA attacks.

Many hardware based countermeasures (circuit and block levels) have been developed over the years in order to increase the security of cryptographic algorithms. These Countermeasures may be divided into two types: countermeasures that lead to a constant energy consumption per system clock cycle and such that lead to a random energy consumption of cryptographic devices.

The first group of countermeasures include Dual-rail logic based families such as Sense Amplifier Based Logic (SABL), Charge Recycling SABL (CRSABL), Dual Spacer Dual Rail (DSDR), Delay Based Dual Rail (DDPL), Three Phase Dual Rail (TDPL), Wave Dynamic and Differential (WDDL), Divided WDDL, DWDDL, and Dynamic Current Mode Logic (DyCML), Adiabatic Logic based families that specializes in ultra-low power dissipation and low frequencies such as Symmetric Adiabatic Logic (SyAL), Secure Adiabatic Logic (SAL), Charge-Sharing Symmetric Adiabatic Logic (CCSAL), and Secured Quasi-Adiabatic Logic (SQAL). This group of countermeasures aims to flatten the energy consumption per cycle and thus make it data-independent. However, these countermeasures rely on the symmetry of their gate structures as they were proved to be sensitive to process mismatch, hazards, coupling capacitances, process variations, noise, and delay imbalance. Thus, almost all these countermeasures are vulnerable to revealing secret data.

The second group of countermeasures include techniques that aim to randomize the power profile of the cryptographic devices such as masking, Random pre-charge Logic (RPL), Random delay Insertion (RDI), and gate level randomization. These countermeasures have been shown to be insecure against sufficient computational effort or invasive attackers. The masking techniques presented in are considered as equivalent to system-level countermeasure approach and not a hardware circuit level technique, as these techniques are actually equivalent to adding bits to secret key. The idea of random precharge logic, RPL, technique presented in is to randomly precharge all the data inputs during the clock cycle with a random value generated from a random number generator (RNG). The main drawback of this technique is its vulnerability to DPA/CPA attacks at the end or beginning of the precharge period; i.e., pre-charge interface with new system input vectors (This point is highly important in the context of this work and will be detailed and clarified in next section). The random delay insertion, RDI, technique presented in exploits the insertion of random delays to the beginning of each logical path (right after the sequential element) to randomize the attacked current dissipation-time (which depends on the data arrival time to the attacked node). Thus if current is consumed at the attacked node at different times (in respect to the clock cycle rising edge) for different computations no synchronization is possible for an attacker. This means that it will be harder to retrieve meaningful statistics on many numbers of traces. Though this technique is extremely powerful it requires an excessive area for the delay units which are incorporated to each of the system inputs. Furthermore, since this method includes delay units on the data lines and furthermore in a location which is right after the synchronized sequential elements, it is vulnerable to DPA/CPA attacks.

Additional background art includes:

[1] Y. Zhang, L. T. Yang and J. Chen, "RFID and Sensor Networks: Architectures, Protocols, Security, and Integrations," Taylor & Francis, 2010.

[2] W. Rankl and W. Effing, "Smart Card Handbook," Wiley, 2004.

[3] K. Finkenzeller and D. Muller, "RFID Handbook: Fundamentals and Applications in Contactless Smart Cards, Radio Frequency Identification and Near-Field Communication," Wiley, 2010.

[4] D. R. Stinson, "Cryptography: Theory And Practice," Chapman & Hall/CRC, 2006.

[5] A. Juels, "RFID security and privacy: A research survey," *IEEE J. Sel. Areas Commun.*, vol. 24, pp. 381-394, February 2006.

[6] P. Kocher, J. Jaffe and B. June, "Differential power analysis," in Advances in Cryptology-CRYPTO'99, pp. 388-397, 1999.

[7] P. C Kocher, "Timing attacks on implementations of Diffie-Hellman, RSA, DSS, and other systems," in Advances in Cryptology-CRYPTO'96, pp. 104-113, 1996.

[8] S. Mangard, N. Pramstaller and E. Oswald, "Successfully attacking masked AES hardware implementations," in Cryptographic Hardware and Embedded Systems-CHES 2005, Springer, pp. 157-171, 2005.

[9] S. Mangard, E. Oswald and T. Popp, "Power analysis attacks: Revealing the secrets of smart cards," Springer Science Business Media, 2007.

[10] K. Wu, H. Li, T. Chen and F. Yu, "Electromagnetic analysis on elliptic curve cryptosystems: Measures and counter-measures for smart cards," in Intelligent Information Technology Application, IITA 2009, Third International Symposium on, pp. 40-43, 2009.

[11] B. Gammel, H. Bock and M. Goessel, "Cryptographic Unit and Method for Oprerating a Cryptographic Unit," vol. Ser. No. 11/318,061, Aug. 16, 2007.

[12] J. Coron, "Resistance against differential power analysis for elliptic curve cryptosystems," in Cryptographic Hardware and Embedded Systems, pp. 292-302, 1999.

[13] M. Joye, P. Paillier and B. Schoenmakers, "On second-order differential power analysis," in Cryptographic Hardware and Embedded Systems—CHES 2005, Springer, pp. 293-308, 2005.

[14] G. B. Ratanpal, R. D. Williams, and T. N. Blalock, "An on-chip signal suppression countermeasure to power analysis attacks," *IEEE Trans. Dependable Secure Comput.*, vol. 1, pp. 179-189, July-September 2004.

[15] T. Popp, S. Mangard, and E. Oswald, "Power analysis attacks and countermeasures," *IEEE Design Test Comput.*, vol. 24, no. 6, pp. 535-543, November-December 2007.

[16] J. S. Coron and G. Louis, *On Boolean and Arithmetic Masking Against Differential Power Analysis*. Berlin/Heidelberg, Germany: Springer, 2000, pp. 231-237.

[17] H. Qu, J. Xu, and Y. Yan, "A random delay design of processor against power analysis attacks," in *Proc. 10th IEEE Int. Conf. Solid-State Integr. Circuit Technol. (ICSICT)*, November 2010, pp. 254-256.

[18] K. H. Boey, Y. Lu, M. O'Neill, and R. Woods, "Random clock against differential power analysis," in *Proc. IEEE Asia Pacific Conf. Circuits Syst. (APCCAS)*, December 2010, pp. 756-759.

[19] K. Tiri and I. Verbauwhede, "A logic level design methodology for a secure DPA resistant ASIC or FPGA implementation," in Proceedings of the Conference on Design, automation and test in Europe, vol 1, pp. 10246, 2004.

[20] K. Tiri and I. Verbauwhede, "Charge recycling sense amplifier based logic: securing low power security ICs against DPA [differential power analysis]," in *Solid-State Circuits Conference, 2004. ESSCIRC 2004. Proceeding of the 30th European*, 2004, pp. 179-182.

[21] D. Sokolov, J. Murphy, A. Bystrov, and A. Yakovlev, "Improving the Security of Dual-Rail Circuits," in *Cryptographic Hardware and Embedded Systems-CHES 2004*, M. Joye and J.-J. Quisquater, Eds. Springer Berlin Heidelberg, 2004, pp. 282-297.

[22] D. Sokolov, J. Murphy, A. Bystrov, and A. Yakovlev, "Design and analysis of dual-rail circuits for security applications," *IEEE Trans. Comput.*, vol. 54, no. 4, pp. 449-460, April 2005.

[23] M. Bucci, L. Giancane, R. Luzzi, G. *Scotti*, and A. Trifiletti, "Delay-Based Dual-Rail Precharge Logic," *IEEE Trans. Very Large Scale Integr. VLSI Syst.*, vol. 19, no. 7, pp. 1147-1153, July 2011.

[24] M. Bucci, L. Giancane, R. Luzzi, and A. Trifiletti, "Three-Phase Dual-Rail Pre-charge Logic," in *Cryptographic Hardware and Embedded Systems-CHES 2006*, L. Goubin and M. Matsui, Eds. Springer Berlin Heidelberg, 2006, pp. 232-241.

[25] M. Bucci, L. Giancane, R. Luzzi, and A. Trifiletti, "A Flip-flop for the DPA Resistant Three-phase Dual-rail Pre-charge Logic Family," *IEEE Trans Very Large Scale Integr. Syst.*, vol. 20, no. 11, pp. 2128-2132, November 2012.

[26] K. Tiri, M. Akmal and I. Verbauwhede, "A dynamic and differential CMOS logic with signal independent power consumption to withstand differential power analysis on smart cards," in *Solid-State Circuits Conference, ESSCIRC 2002, Proceedings of the 28th European*, pp. 403-406, 2002.

[27] D. D. Hwang, K. Tiri, A. Hodjat, B.-C. Lai, S. Yang, P. Schaumont, and I. Verbauwhede, "AES-Based Security Coprocessor IC in 0.18—CMOS With Resistance to Differential Power Analysis Side-Channel Attacks," *IEEE J. Solid-State Circuits*, vol. 41, no. 4, pp. 781-792, April 2006.

[28] F. Mace, I. Hassoune, and others, "A Dynamic Current Mode Logic to Counteract Power Analysis Attacks," In *The Proceedings of DCIS 2004*, 2004.

[29] B. Choi, K. E. Kim, K. Chung, and D. K. Kim, "Symmetric adiabatic logic circuits against differential power analysis," *ETRIJ.*, vol. 32, pp. 166-168, February 2010.

[30] M. Khatir and A. Moradi, "Secure adiabatic logic: A low-energy DPA-resistant logic style," *IACR Eprint archive*, 2008.

[31] C. Monteiro, T. Yasuhiro, and S. Toshikazu, "Low power secure AES S-box using adiabatic logic circuit," in *Proc. IEEE Faible Tension Faible Consommation (FTFC)*, June 2013, pp. 1-4.

[32] C. Monteiro, T. Yasuhiro, and S. Toshikazu, "DPA-resistance of charge sharing symmetric adiabatic logic," in *Proc. IEEE Int. Symp. Circuits Syst. (ISCAS)*, May 2013, pp. 2581-2584.

[33] M. Avital, H. Dagan, I. Levi, O. Keren, and A. Fish, "DPA-Secured Quasi-Adiabatic Logic (SQAL) for Low-Power Passive RFID Tags Employing S-Boxes," *Circuits and Systems I: Regular Papers, IEEE Transactions on*, vol. 62, no. 1, pp. 149, 156, January 2015.

[34] S. K. Saha, "Modeling Process Variability in Scaled CMOS Technology," *IEEE Design & Test of Computers*, vol. 27, no. 2, pp. 8-16, 2010.

[35] S. Mangard, N. Pramstaller, and E. Oswald, "Successfully Attacking Masked AES Hardware Implementations," in *Cryptographic Hardware and Embedded Systems—CHES* 2005, J. R. Rao and B. Sunar, Eds. Springer Berlin Heidelberg, 2005, pp. 157-171.

[36] D. K. Sharma, B. K. Kaushik, and R. K. Sharma, "Signal integrity and propagation delay analysis using FDTD technique for VLSI interconnects," *J. Comput. Electron.*, vol. 13, no. 1, pp. 300-306, March 2014.

[37] P. Heydari and M. Pedram, "Capacitive coupling noise in high-speed VLSI circuits," *IEEE Trans. Comput.-Aided Des. Integr. Circuits Syst.*, vol. 24, no. 3, pp. 478-488, March 2005.

[38] H. Xu, V. F. Pavlidis, X. Tang, W. Burleson, and G. De Micheli, "Timing Uncertainty in 3-D Clock Trees Due to Process Variations and Power Supply Noise," *IEEE Trans. Very Large Scale Integr. VLSI Syst.*, vol. 21, no. 12, pp. 2226-2239, December 2013.

[39] D. P. Triantis, A. N. Birbas, and D. Kondis, "Thermal noise modeling for short-channel MOSFETs," *IEEE Trans. Electron Devices*, vol. 43, no. 11, pp. 1950-1955, November 1996.

[40] H. H. Chen and D. D. Ling, "Power Supply Noise Analysis Methodology for Deep-submicron VLSI Chip Design," in *Proceedings of the 34th Annual Design Automation Conference*, New York, N.Y., USA, 1997, pp. 638-643.

[41] D. Suzuki and M. Saeki, "Security Evaluation of DPA Countermeasures Using Dual-Rail Pre-charge Logic Style," in *Cryptographic Hardware and Embedded Systems—CHES* 2006, L. Goubin and M. Matsui, Eds. Springer Berlin Heidelberg, 2006, pp. 255-269.

[42] C. Clavier, J.-S. Coron, and N. Dabbous, "Differential Power Analysis in the Presence of Hardware Countermeasures," in *Cryptographic Hardware and Embedded Systems—CHES* 2000, C. K. Koc and C. Paar, Eds. Springer Berlin Heidelberg, 2000, pp. 252-263.

[43] S. Mangard, "Hardware Countermeasures against DPA—A Statistical Analysis of Their Effectiveness," in *Topics in Cryptology—CT-RSA* 2004, T. Okamoto, Ed. Springer Berlin Heidelberg, 2004, pp. 222-235.

[44] T. Popp, M. Kirschbaum, T. Zefferer, and S. Mangard, "Evaluation of the Masked Logic Style MDPL on a Prototype Chip," in *Cryptographic Hardware and Embedded Systems-CHES* 2007, P. Paillier and I. Verbauwhede, Eds. Springer Berlin Heidelberg, 2007, pp. 81-94.

[45] E. De Mulder, B. Gierlichs, B. Preneel, and I. Verbauwhede, "Practical DPA attacks on MDPL," in *First IEEE International Workshop on Information Forensics and Security*, 2009. WIFS 2009, 2009, pp. 191-195.

[46] A. Moradi, M. Salmasizadeh, and M. T. M. Shalmani, "Power Analysis Attacks on MDPL and DRSL Implementations," in *Information Security and Cryptology-ICISC* 2007, K.-H. Nam and G. Rhee, Eds. Springer Berlin Heidelberg, 2007, pp. 259-272.

[47] T. Popp and S. Mangard, "Implementation aspects of the DPA-resistant logic style MDPL," in *2006 IEEE International Symposium on Circuits and Systems*, 2006. ISCAS 2006. Proceedings, 2006, p. 4 pp.-2916.

[48] M. Bucci, M. Guglielmo, R. Luzzi, and A. Trifiletti, "A power consumption randomization countermeasure for DPA-resistant cryptographic processors," *Integrated Circuit and System Design. Power and Timing Modeling, Optimization and Simulation. 14th International Workshop, PATMOS* 2004. Proceedings (Lecture Notes in Comput. Sci. Vol. 3254), pp. 481-490, 2004.

[49] M. Bucci, R. Luzzi, M. Guglielmo, and A. Trifiletti, "A countermeasure against differential power analysis based on random delay insertion," in *Circuits and Systems*, 2005. ISCAS 2005. IEEE International Symposium on, 23-26 May 2005, 2005, pp. 3547-3550.

[50] M. Avital, H. Dagan, O. Keren, and A. Fish, "Randomized Multitopology Logic Against Differential Power Analysis," *IEEE Trans. Very Large Scale Integr. VLSI Syst.*, vol. Early Access Online, 2014.

SUMMARY OF THE INVENTION

As more digital systems involve storing sensitive information, immunity to side-channel attacks becomes essential. Cryptographic devices are designed to protect secret information and provide secure communication however they are susceptible to side channel attacks (SCA). Several attack techniques such as single-bit/multi-bit: Differential Power Analysis (DPA), Correlation Power Analysis (CPA), and Differential Electromagnetic Analysis (DEMA) are considered powerful SCA nowadays, as they do not require special equipment, they are fast to perform, non-invasive, and easy to establish and repeat.

Embodiments herein include digital hardware methodologies (gate level and circuit level) in cryptographic devices designed to handle and increase the resistance against side channel attacks, and in particular against the mentioned single-bit/multi-bit DPA, CPA and DEMA attacks.

According to an aspect of some embodiments of the present invention there is provided a randomization element which includes: a logic input for inputting a logic signal, a logic output for outputting the logic signal at a delay and a delay element. The delay element introduces a delay between the logic input and the logic output, and operates selectably in static mode and in dynamic mode in accordance with a mode control signal.

According to some embodiments of the invention, during dynamic operation the delay is controlled by a timing of a clock signal.

According to some embodiments of the invention, the delay element operates in precharge mode, and a logic level at the logic input is output at the logic output on a rising edge of the clock signal.

According to some embodiments of the invention, the delay element operates in predischarge mode, and a logic level at the logic input is output at the logic output on a falling edge of the clock signal.

According to some embodiments of the invention, the randomization element further includes a logic gate which performs a logic function. The logic input of the randomization element is connected to a logic output of the logic gate, such that the logic gate and randomization element operate in tandem to provide the logic function in static or dynamic mode in accordance with the mode control signal and with a timing controlled by the mode control signal and a clock signal.

According to some embodiments of the invention, the delay element includes: a first two-to-one multiplexer, having a first input connected to a ground signal, a second input connected to a clock signal, an output and a control input connected to the mode control signal; and a second two-to-one multiplexer, having a first input connected to the logic input, a second input connected to a reference voltage, an output connected to the logic output and a respective control input connected to the output of the first two-to-one multiplexer. The control input of the first two-to-one multiplexer selects between the first and the second inputs of the first two-to-one multiplexer for outputting at the output of the first two-to-one multiplexer, and the control input of the second two-to-one multiplexer selects between the first and the second inputs of the second two-to-one multiplexer for outputting at the output of the second two-to-one multiplexer.

According to some embodiments of the invention, during dynamic operation of the delay element the duration of the delay is controlled by a timing of the clock signal.

According to some embodiments of the invention, during static operation the delay element minimizes the propagation delay of the logic signal through the randomization element.

According to an aspect of some embodiments of the present invention there is provided a logic circuit which includes: multiple logic gates, multiple randomization elements interspersed between the logic gates, and a control sequence provider. Each of the randomization elements introduces a delay between the logic output of a respective preceding logic gate and the logic input of a respective following logic gate, and each of the randomization elements operates selectably in static mode and in dynamic mode in accordance with a respective mode control signal. The control sequence provides sequences of control signals to the randomization elements, wherein the sequences are selected to shape a logic circuit power profile and logic signal propagation timing during logic circuit operation, so as to combat side channel attacks.

According to some embodiments of the invention, some of the randomization elements operate in precharge mode and others of the randomization elements operate in predischarge mode.

According to some embodiments of the invention, a respective delay of each of the randomization elements is controlled by a timing of a respective clock signal.

According to some embodiments of the invention, when a randomization element operates in precharge mode a logic level obtained from the logic output of the respective preceding logic gate is provided to the logic input of the respective following logic gate on the rising edge of the respective clock signal.

According to some embodiments of the invention, when a randomization element operates in precharge mode a logic level obtained from the logic output of the respective preceding logic gate is provided to the logic input of the respective following logic gate on the falling edge of the respective clock signal.

According to some embodiments of the invention, for at least one of the randomization elements, an input of the randomization element is connected to a logic output of a logic gate performing a respective logic function, such that the logic gate and randomization element operate in tandem to provide the logic function in static or dynamic mode in accordance with a respective mode control signal and with a delay controlled by a respective delay control signal.

According to some embodiments of the invention, the respective delay control signal is a clock signal.

According to some embodiments of the invention, the control sequence provider generates the sequences of control signals.

According to some embodiments of the invention, the sequences of control signals are random sequences.

According to some embodiments of the invention, the sequences of control signals are input from an external device through a control sequence input connection.

According to some embodiments of the invention, at least one of the randomization elements includes: a first two-to-one multiplexer, having a first input connected to a ground signal, a second input connected to a clock signal, an output and a control input connected to the mode control signal; and a second two-to-one multiplexer, having a first input connected to the logic input, a second input connected to a reference voltage, an output connected to the logic output and a respective control input connected to the output of the first two-to-one multiplexer. The control input of the first two-to-one multiplexer selects between the first and the second inputs of the first two-to-one multiplexer for outputting at the output of the first two-to-one multiplexer, and the control input of the second two-to-one multiplexer selects between the first and the second inputs of the second two-to-one multiplexer for outputting at the output of the second two-to-one multiplexer.

According to an aspect of some embodiments of the present invention there is provided a method for combating side channel attacks on a logic circuit. The method includes:

i) providing a logic circuit which includes: multiple logic gates and multiple randomization elements interspersed between the logic gates, each of the randomization elements introducing a delay between a logic output of a respective preceding logic gate and a logic input of a respective following logic gate, wherein each of the randomization elements operates selectably in static mode and in dynamic mode in accordance with a respective control signal and wherein a respective delay of each of the randomization elements is controlled by a timing of a respective clock signal;

ii) selecting a sequence of control signals to shape a logic circuit power profile and logic signal propagation timing during logic circuit operation so as to combat side channel attacks; and iii) inputting the sequence of control signals to the randomization elements.

According to some embodiments of the invention, the sequence of control signals is selected to randomize at least one of the logic circuit power profile and the logic signal propagation timing.

According to some embodiments of the invention, some of the randomization elements operate in precharge mode and other randomization elements operate in predischarge mode.

According to some embodiments of the invention, the clock signals are synchronized.

According to some embodiments of the invention, the method includes adjusting a relative timing of the clock signals to further shape at least one of the logic signal propagation timing and the logic circuit power profile.

According to some embodiments of the invention, the sequence of control signals is selected by inputting the sequence from an element external to the logic circuit.

According to some embodiments of the invention, the control sequence is one of: a random sequence and a semi-random sequence.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
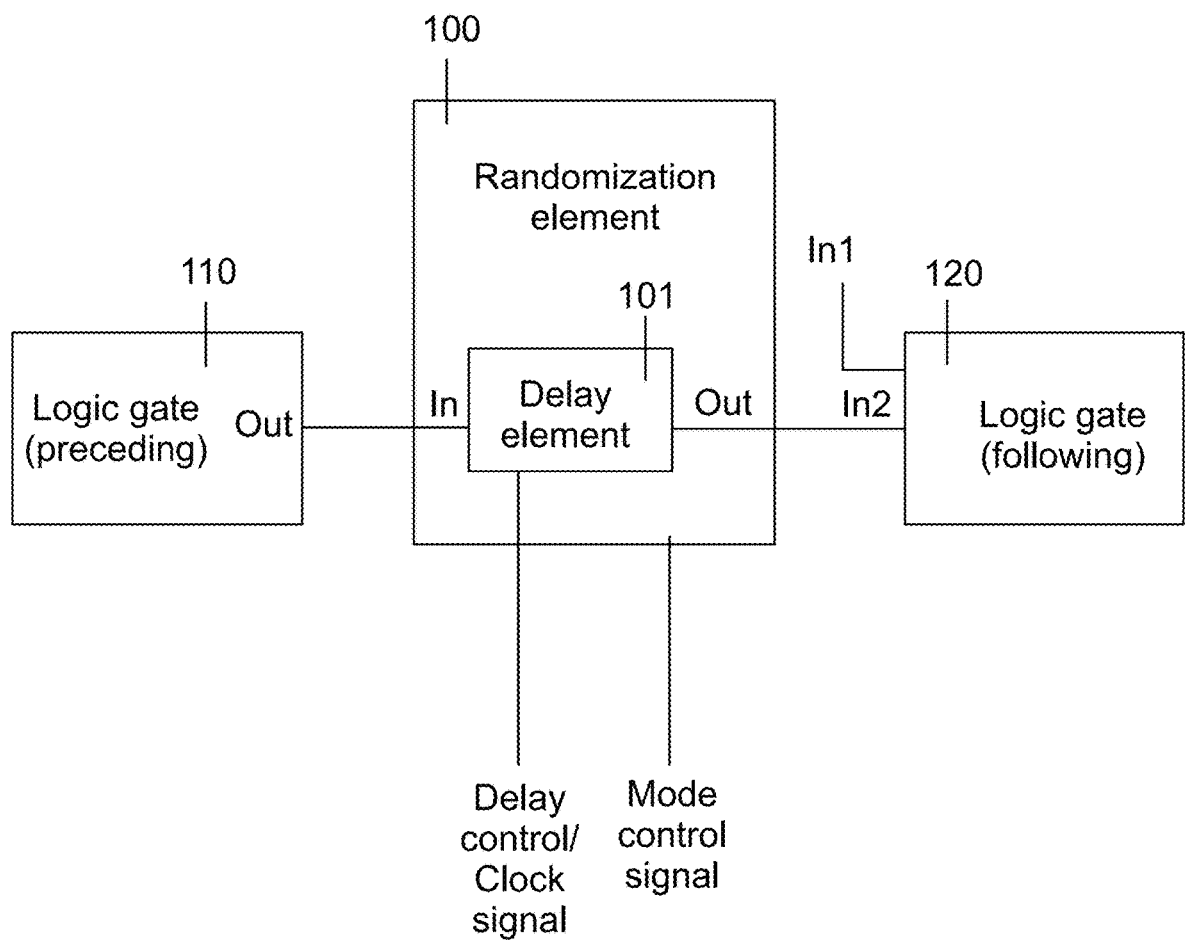
FIG. 1 is a simplified block diagram of a randomization element, according to embodiments of the invention.

The present invention, in some embodiments thereof, relates to a logic circuit designed for protection against side channel attacks, and, more particularly, but not exclusively, to a method for operating such a logic circuit to protect against side channel attacks.

The embodiments presented here perform Randomized Multi Topology and Timing Logic (RMT$^2$L). The RMT$^2$L approach is based on random selection between two topologies, static and dynamic (where the last may pre-charge or pre-discharge the output voltage) using an RMT$^2$L unit (embodiments of which are presented below). The RMT$^2$L units may be placed in any desired location in a logic circuit (e.g. a crypto-core\module). RMT$^2$L provides different delays at the clock signals of the RMT$^2$L (i.e., pre-charge/pre-discharged starting/ending points), using a modular and power-efficient delay system. The construction of the RMT$^2$L units and their utilization in a sophisticated random-delay and random-topology scheme results in a powerful high-immunity PA hardware. RMT$^2$L simulation results under different configurations (presented below) show immunity to DPA/CPA attacks as compared to the CMOS family. These results also indicate higher immunity to DEMA attacks, as the randomized power profile of these gates results in randomized electromagnetic radiation as well.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

RMT$^2$L Overview

The RMT$^2$L concept is implemented using RMT$^2$L units which have two modes of operation: static and dynamic. These RMT$^2$L units are connected to chosen outputs of standard existing gates composing the logic circuit (e.g. cryptographic device), and they do not affect or harm the functionality of the system. Each RMT$^2$L unit may be randomly operated in static mode (CMOS-like) or in one of two dynamic modes (precharge or predischarge) at each system clock cycle. The location of the RMT²L units is designed in such a way that the random propagation time delay will cover the whole clock cycle period or some large part of it (spreading the correlative currents from the system on large portion of the clock cycle). The RMT²L units may also be used for introducing initial conditions to the logic circuit. With this understanding, the power signature of such a logic circuit (e.g. cryptographic device) is hard to be captured in large number of samples (large statistics) because no synchronization is possible. Such a crypto-system that includes RMT²L units is therefore much more immune to power attacks.

RMT²L Unit

In some embodiments, the RMT²L unit is a randomization element which operates in static and dynamic mode in accordance with a mode control signal, and serves to introduce a controllable delay between the randomization element's input and output. As described below, including randomization elements in a logic circuit may be used to introduce random initial conditions to the logic circuit and/or to control propagation timing of the logic signals through the logic circuit.

Reference is now made to FIG. 1, which is a simplified block diagram of a randomization element according to embodiments of the invention. Randomization element 100 is located between the output gate of logic gate 110 and an input of logic gate 120 (shown here with two logic inputs for exemplary purposes). Delay element 101 introduces a delay between the logic signal output by logic gate 110 and a logic input of logic gate 120, based on a delay control and/or clock signal as described below. Optionally, under certain conditions (e.g. in static mode) no additional delay is introduced into the logic signal path by randomization element 100, other than the propagation time of the logic signal through the randomization element. Randomization element 100 operates selectably in static mode and in dynamic mode in accordance with the mode control signal. The power profile of each mode of operation (i.e. static or dynamic) is different for the same logic computation.

Optionally, a clock signal is provided to randomization element 100 and during dynamic operation the delay introduced by randomization element 100 is controlled by a timing of the clock signal.

Optionally, the randomization element operates in both static and dynamic precharge modes. During precharge (i.e. setting up the initial conditions) randomization element 100 provides a logic level '1' to the logic input of logic gate 120 on the rising edge of the clock signal and for as long as the clock signal is in logic high and the mode control signal selects dynamic operation.

In alternate embodiments, the randomization element operates in both static and dynamic predischarge modes. During predischarge randomization element 100 provides a logic level '0' to the logic input of logic gate 120 on the rising edge of the clock signal and for as long as the clock signal is in logic high and the mode control signal selects dynamic operation.

Optionally, during evaluation mode (i.e. the falling edge of the clock signal) the logic level output from logic gate 110 is provided via randomization element 100 to the logic input of logic gate 120.

Figure 2A:
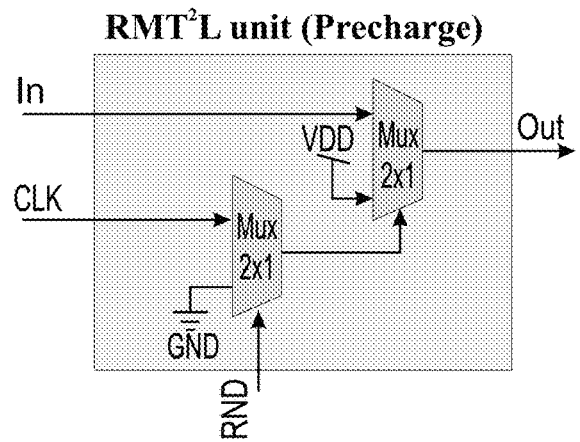
FIGS. 2A and 2B are simplified block diagrams of an RMT$^2$L precharge unit and an RMT$^2$L predischarge unit respectively, according to exemplary embodiments of the invention.
Figure 2B:
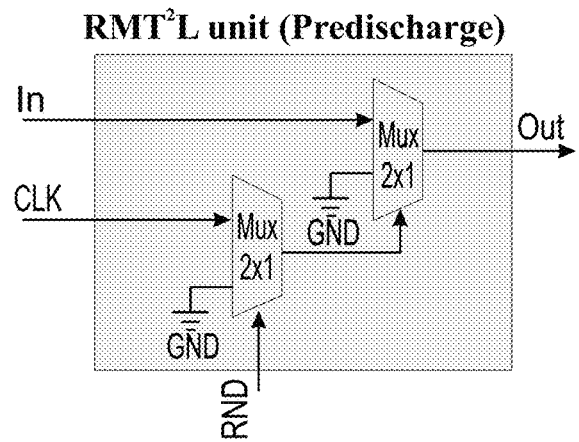

FIGS. 2A and 2B are simplified circuit diagrams of exemplary embodiments of an RMT²L unit. In the embodiment of FIG. 2A, RMT²L unit may operate either in static mode or in dynamic precharge mode. In the embodiment of FIG. 2B, RMT²L unit may operate either in static mode or in dynamic predischarge modes.

The exemplary embodiments of FIGS. 2A and 2B are based on two degenerated 2×1 multiplex (Mux) components. The RMT²L unit concept may be implemented within different ways and different standard logic components (e.g., implementation with only logic gates instead of using Mux components). The truth tables of the RMT²L unit are presented in Table 1 and Table 2 (for units with precharge and predischarge respectively).

TABLE 1

Truth table of RMT²L Precharge unit

| CLK | RND | Out |
| --- | --- | --- |
| Don't care | 1 | In (Static) |
| 1 | 0 | 1 (Precharge) |
| 0 | 0 | In (Evaluation) |

TABLE 2

Truth table of RMT²L Predischarge unit

| CLK | RND | Out |
| --- | --- | --- |
| Don't care | 1 | In (Static) |
| 1 | 0 | 0 (Predischarge) |
| 0 | 0 | In (Evaluation) |

Cascading an RMT²L Unit to Standard Gates

An RMT²L unit may be connected to an output of any logic gate, as illustrated by the cascading of logic gate 110 to randomization element 100 in FIG. 1. Optionally, logic gate 110 and randomization element 100 operate in tandem to provide the logic function implemented by logic gate 110 in static or dynamic mode, in accordance with the mode control signal into randomization element 100.

Figure 3:
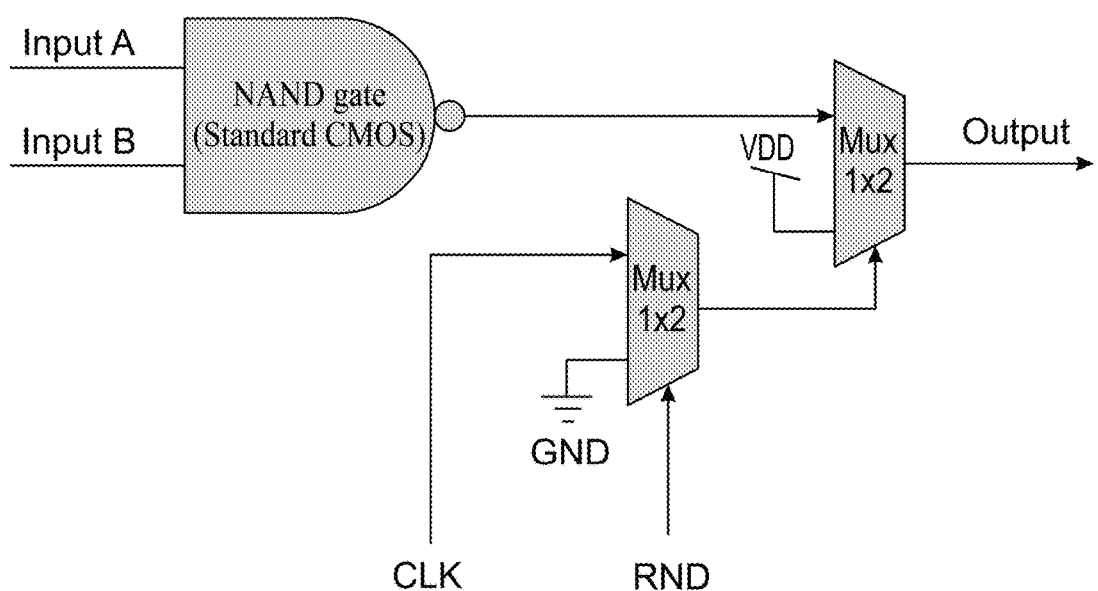
FIG. 3 illustrates cascading a standard gate to an RMT$^2$L unit with precharge.

In some embodiments, an RMT²L unit is placed in any location inside a logic circuit (e.g. crypto-system) where it is desired to control operating mode and/or timing (i.e. delay). The RMT²L unit (either precharge or predischarge type) is connected to the output of a standard gate existing in this location. An example of cascading a standard CMOS NAND gate to a RMT²L unit with precharge is shown in FIG. 3.

As a result of this connectivity, the output of the RMT²L unit behaves like the output of the standard CMOS NAND gate when static mode is set, and it behaves like dynamic precharge logic when dynamic mode is set. Thus, by cascading a standard gate to an RMT²L unit, the logic gate may be selectably operated in two modes, where each mode obviously consumes completely different power. In the same way an RMT²L unit with predischarge may be simply cascaded to an output of any standard gate.

Logic Circuit with Randomization Elements

Figure 4:
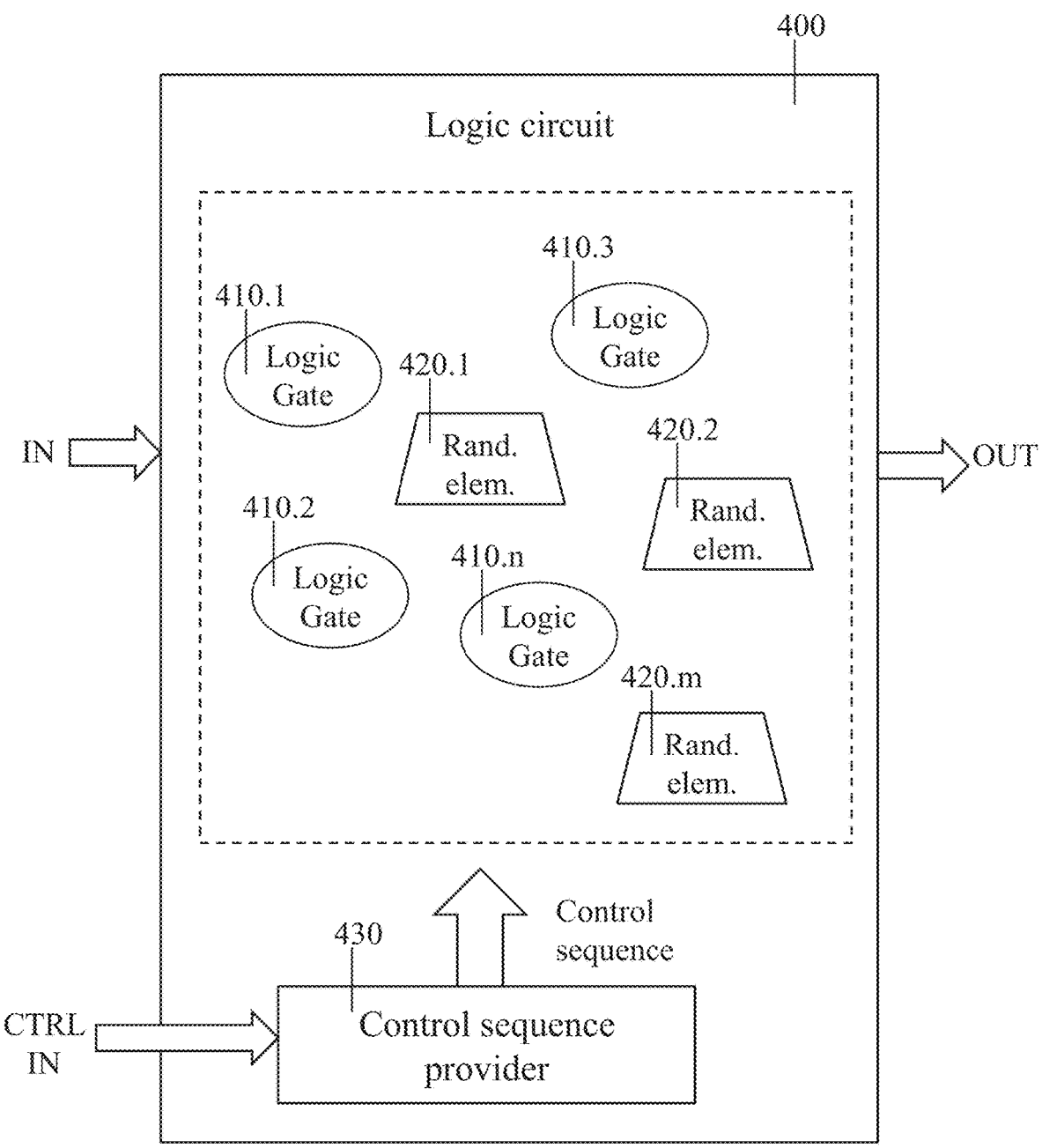
FIG. 4 is a simplified block diagram of a logic circuit with randomization elements, according to embodiments of the invention.

Reference is now made to FIG. 4, which is a simplified block diagram of a logic circuit with randomization elements, according to embodiments of the invention. The non-limiting example shown here includes four logic gates and three randomization elements; however it is to be understood that other embodiments may include different numbers of logic gates and/or randomization elements. For clarity and generality, connections between the circuit elements are not shown. Note that other circuit elements may be present between the randomization element and the preceding and/or following logic gate, as required for circuit operation.

Logic circuit 400 includes randomization elements (420.1-420.*m*) interspersed between logic gates (410.1-410.*n*). Each of the randomization elements may introduce a delay between the logic output of the preceding logic gate and the logic input of the following logic gate. Each of the randomization elements operates selectably in static mode and in dynamic mode in accordance with a respective mode control signal. Control sequence provider 430 provides sequences of control signals to the randomization elements. The sequences are selected to shape the logic circuit's power profile and signal propagation timing during operation, so as to combat side channel attacks.

Optionally, the sequence of control signals is generated by and/or stored in control sequence provider 430. Alternately or additionally, the control sequence is input to control sequence provider 430 from an external source.

Optionally the control sequence is a random sequence.

Optionally, the control sequence is selected to distribute precharge and predischarge timing throughout the logic pathways.

In some embodiments, some of the randomization elements operate in precharge mode and others operate in predischarge mode.

Optionally, the delay time introduced by each of the randomization elements is controlled by a timing of a respective clock signal. Alternately or additionally the clock signals are synchronized. Optionally, the same clock signal (e.g. system clock) is input to all of the randomization elements.

Embodiments of logic circuits with randomization elements may be implemented in circuits, including, but not limited to:

a) An integrated circuit (IC) customized for a particular use, such as an Application-Specific Integrated Circuit (ASIC);

b) A programmable logic device intended for general-purpose use. Examples of such programmable logic devices include, but are not limited to: Field-Programmable Gate Array (FPGA), Gate Array, Uncommitted Logic Array (ULA), Programmable Logic Array (PLA), Programmable Array Logic (PAL), Complex Programmable Logic Device (CPLD), Erasable Programmable Logic Device (EPLD) and Structured ASIC.

Using RMT²L Units in a Typical Path of Crypto-System

Figure 5:
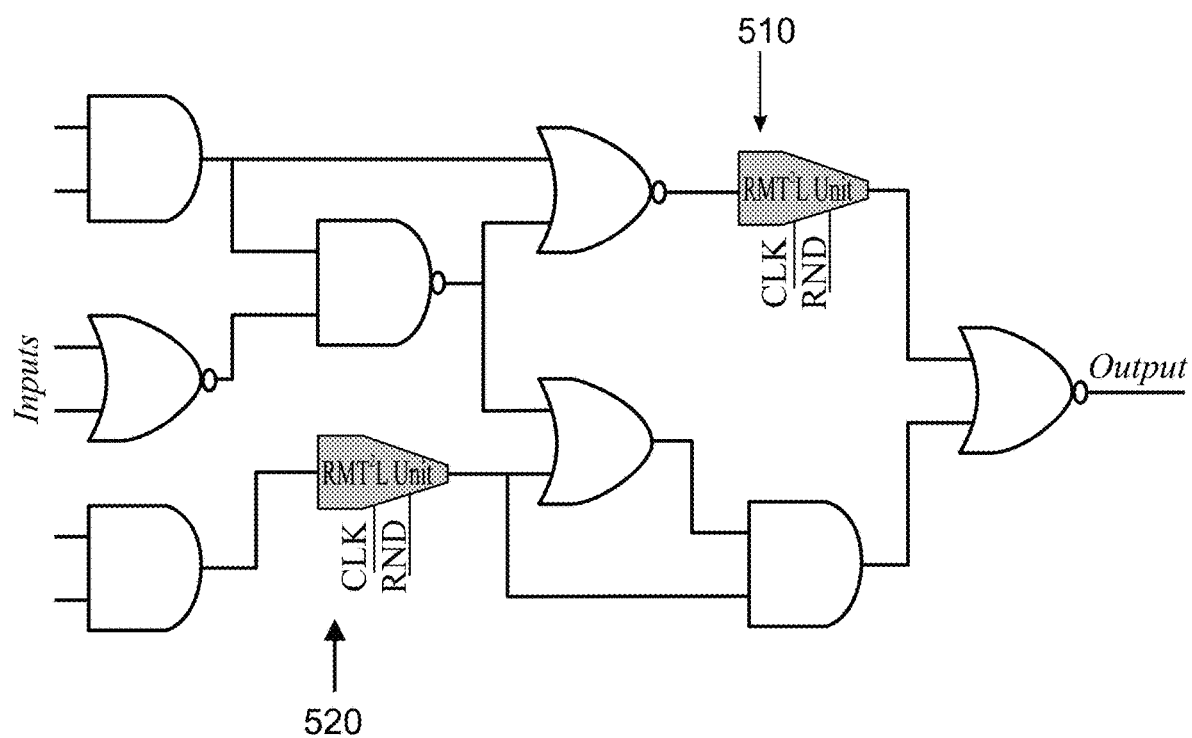
FIG. 5 is an illustration of an exemplary logic path inside a crypto-system.

A typical path of a crypto-system implemented using logic gates may be considered as a logic cloud consisting of standard gates, inputs and outputs. An example of such a logic path is illustrated in FIG. 5.

In this example two RMT²L units (510 and 520) are placed inside the logic path. As may be seen, these units are connected to the outputs of different standard gates at different locations, and they each have two control signals (CLK and RND) which are governed externally. In one example, the CLK signal is fed by the system clock; the RND signal is a random signal fed by a sequence generator (which typically is present in cryptographic systems), and determines the operation mode of the RMT²L unit. Each RMT²L unit may be implemented either as precharge or predischarge type. This kind of implementation that includes planted RMT²L units has two major effects that significantly improve the immunity to power attacks of the system:

a) These units result in random power profile of the crypto-system.

b) The propagation delays (i.e., timing) of the signals depend on the locations of these units (or their clock phase arrival time—elaborated in the next section). In other words, the designer who determines the RMT²L units locations (or clock phases), may control the timing of the signals. As a result, a smeared picture of propagation delays may be achieved by locating these units cleverly.

Figure 6:
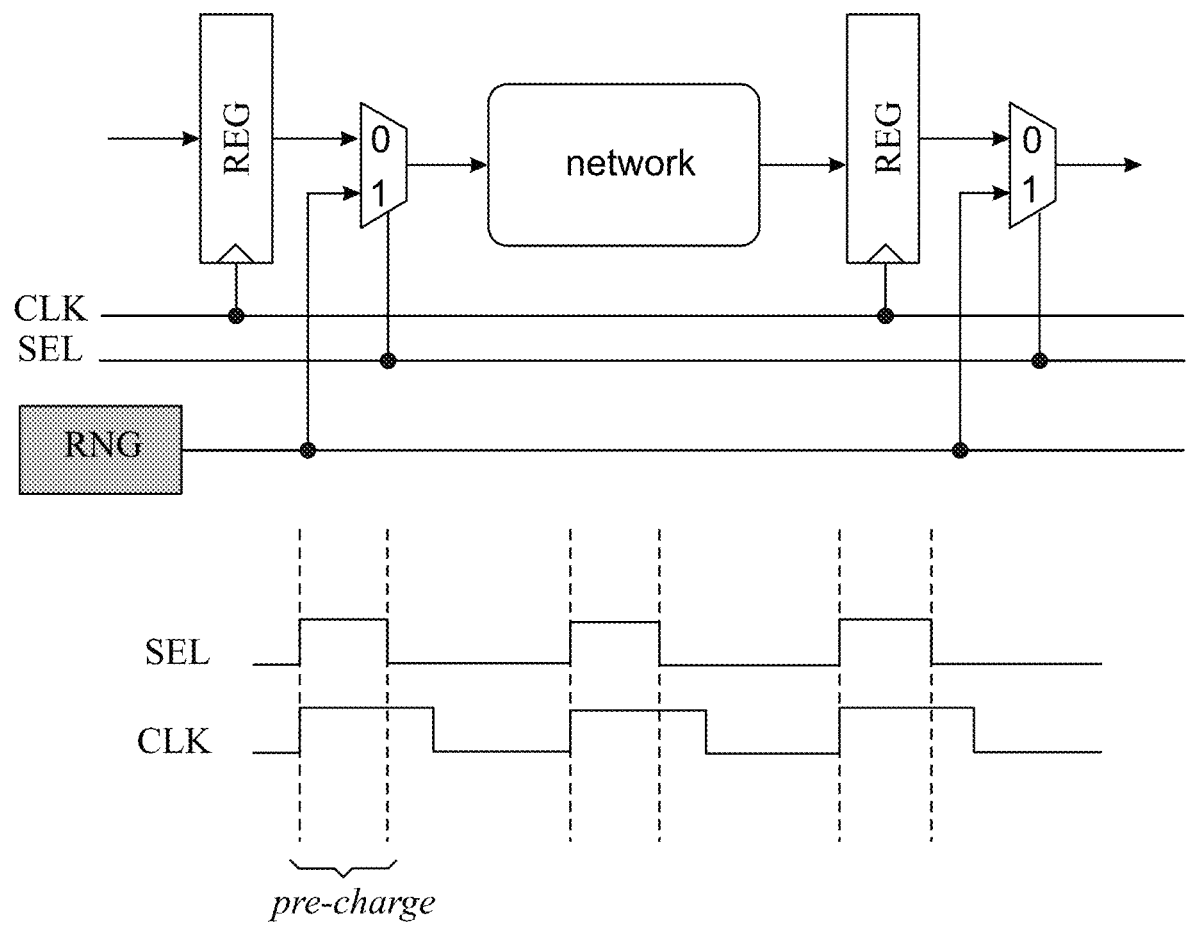
FIG. 6 illustrates random pre-charging (RPL) of combinatorial networks.
Figure 7:
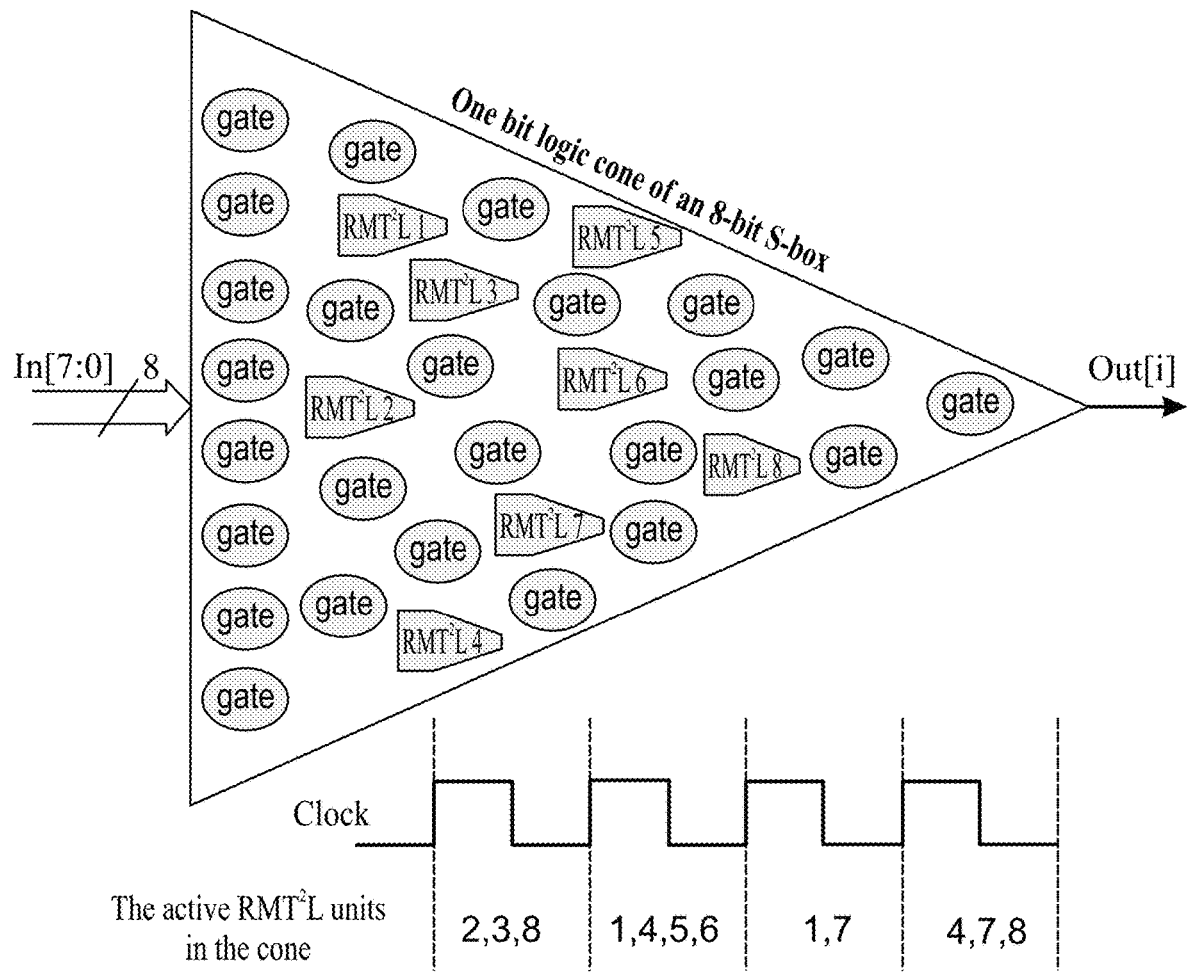
FIG. 7 is a simplified diagram of a logic cone of one bit implementation of an 8-bit S-box using RMT$^2$L units, according to an exemplary embodiment of the invention.
Figure 8:
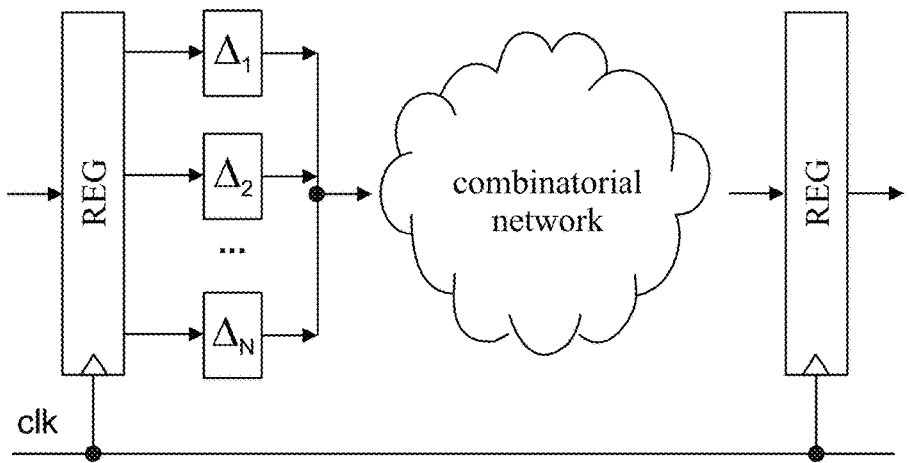
FIG. 8 is a simplified block diagram of an RDI Pipeline stage with random delays.
Figure 9:
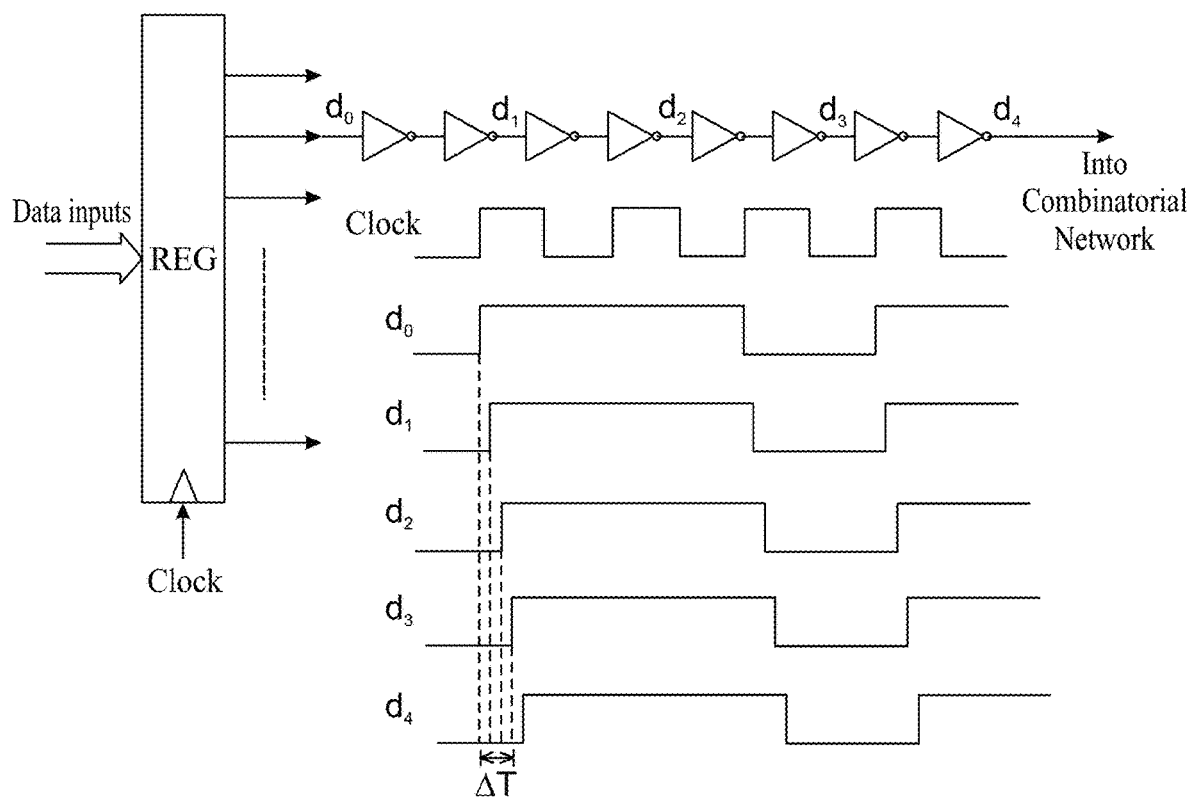
FIG. 9 illustrates RDI vulnerability to attacks.

For purposes of better understanding some embodiments of the present invention, as illustrated in FIGS. 1-5, 7 and 10-19 of the drawings, reference is made to RPL and RDI countermeasures as illustrated in FIGS. 6, 8 and 9.

RPL Vulnerabilities

In RPL countermeasures all data inputs (registers outputs) of the combinatorial logic are precharged to a random value (fed by an RNG) at the beginning of every clock cycle, and the real data is evaluated later on during the clock period (see FIG. 6).

In standard CMOS circuits the consumed current is correlated to the multiplication of the Hamming Distance and Hamming Weight models (i.e. HD·HW). This is due to the current flows from power supply only when a CMOS gate's output changes from 0 to 1. The HW and HD are given by Eq. 1.

$$HW(s) = \sum_{i=0}^{n-1} s(i) \quad (1)$$

$$HD(s_{j-1}, s_j) = HW(s_{j-1} \oplus s_j),$$

where s is a binary vector of length n (e.g., the output data of the S-box block). As a result, the current consumption of a CMOS circuit, I, is correlated only with a specific 0→1 voltage transition. This may be written as a function of two consequent states of the circuit outputs sampled voltage in terms of the clock cycle j, $s_{j-1}$ and $s_j$, as shown in Eq. 2:

$$I \propto \sum_k I(HD(s_{j-1}(k), s_j(k)) \cdot HW(s_j(k))), \quad (2)$$

where $I(HD(s_{j-1}(k), s_j(k)) \cdot HW(s_j(k)))$ is the current contribution from previous to the present clock cycle; it is valuable only when an output rises from 0 to 1.

Conventional RPL is vulnerable to PA attacks during evaluation (i.e., between the falling edge of SEL signal and the end of the clock cycle). At this interval the real data is propagated to the outputs. Prior to this real value assertion (at the evaluation of the clock cycle), a random value was precharged to the whole inputs of the circuit. This means that all the logic (including the outputs) are affected by it and precharges to some values (depending on the random precharged vector at the inputs and on the combinational logic). For large enough statistics that considers all possible random precharged vectors, a random value of such input vector may be averaged to a constant value with $$HW = \frac{n}{2}$$

at the inputs, where n is the input vector length (i.e., it may be considered as all possible options were examined and each input vector and its complement exist). Therefore, the input data may statistically be considered as changing from an averaged-constant value with fixed HW (in this case $\frac{n}{2}$)

to the real data with known HW; the HD between these two states could also be computed from the average precharged input value to the known real data value. In the same fashion that the average input vector of the random precharge process was computed the average output vector of the precharge process could be computed due to the knowledge of the circuit functionality. Therefore this technique is sensitive at the inputs and outputs to Hamming Distance·Hamming Weight, HD·HW model (from some averaged reference state which may be computed). Hence, the power consumption of the module is still correlated to the HD·HW model, where the HD is related to the difference between a certain output value of an i−1 cycle (a real data value) and the output value of the i cycle (an averaged data value). As RPL is sensitive to HD·HW model but only from a reference state R to a current known state $S_j$, it is more correct to refer its vulnerability to the state of only one cycle. In that context we treat the RPL as correlated to the HW model of the current state $s_j$ with the addition of some constant due to the reference state R. It is important to note that since the hypothesized average transition switch is smaller (i.e., from a reference (averaged) state R to 1 in RPL when current is consumed, instead of a 0 to 1 transition in CMOS) then smaller correlation values will be computed in respect to CMOS which makes this method less PA vulnerable.

Accordingly, if referring to the precharge and evaluation periods shown in FIG. 6, the current consumption of the RPL technique is correlated to the HD·HW between 2 consequent cycles (where the first is R and thus correlate to the HW of the current cycle). Such correlations will be visible at the rising edge of the SEL signal (i.e., beginning of the precharge period), as at this point the output changes from previous real data state $s_{j-1}$ to a reference R state; similarly, the they will appear at the falling edge of the SEL signal (i.e., beginning of the evaluation period), as at this point the output changes from previous reference R state to a real data state $s_j$. These two correlations are described in Eqn. 3:

$$I|_{rising\ SEL} \propto \sum_k I(HW(s_{j-1}(k))) \qquad (3)$$

$$I|_{falling\ SEL} \propto \sum_k I(HW(s_j(k))),$$

RMT²L Advantages Over RPL

In contrast with conventional RPL techniques, in RMT²L not all data inputs are precharged to a random value, but only specific nodes inside the logical cone. i.e., parts of the logic will be affected by this precharge and other would not be. Moreover, at different clock cycles the different RMT²L units behave differently (randomly pre-charge\pre-discharge or not) and therefore in each clock cycle different parts of the logic will be affected by different paths coming from random pre\dis-charge elements or from data inputs. Thus, since in the setup phase (equivalent to precharge in RPL) input value have different possible mechanisms (pre-charge, pre-discharge or static-no change), the RMT²L methodology is much less sensitive to any models for any single-bit or multiple-bit hypothesis of Hamming Distance, Hamming Weight, or any of their combinations neither at the module inputs nor at its outputs. Correlation to any of the models will be much smaller. In fact, this point is crucial for the readers understanding: In RPL the random vectors are inserted to the input of the module and it is reasonable to assume an attacker knows the functionality of the module because the cryptographic algorithm is known, therefore he may compute the outputs of the system for any hypothesized random input. However, with RMT²L, the elements are inserted inside the logical cone and therefore the random units impact on the outputs depends on the combinational elements hardware implementation which is not known to the attacker (typically it depends on the system designer and the synthesis tools), this makes their impact to look random for an attacker which is a key strength of this method.

FIG. 7 illustrates the efficiency of using the RMT²L methodology in terms of security. In this example we zoom in to one output of an 8-bit S-box using several RMT²L units. For simplicity we look at one output bit implementation which may be considered as a logic cone. Since for different clock cycles random RMT²L units become active (while all the rest are set to static modes), and in each cycle each node in the circuit will be affected by paths from the input\different RMT²L units and therefore, randomly vary its power profile and propagation delays to the output (will be further discussed next). As a result, the power profile of such a module is less correlated to the processed data, and thus such a module is less sensitive to any of the HW/HD models or any combinations of them.

RDI Vulnerabilities

In RDI countermeasures a random delay is inserted to the input signals of the module in order to randomize its current profile (see FIG. 8). These random delays lead to smeared propagation delay paths at the outputs of the module; thus, this technique might be immune to power attacks if attacking the outputs of the module. However, this technique is vulnerable to power attacks at the inputs of the module. Delay insertion at the inputs induces high correlation between the inputs and the power profile for longer periods (as long as the inserted delay), if attacking the inputs, along a large time interval inside the clock cycle. In the example illustrated in FIG. 9, a random delay of eight inverters is assumed producing a total ΔT delay; they are connected to the second data line of the input register. A data sequence obtained in $d_0$ relative to the clock signal is demonstrated. Since that in the RDI technique the data lines themselves are delayed, the power profile at the switching times are correlated to the input data over a longer time interval ΔT: if there is a switch at the data line $d_0$ (that causes power consumption), all the even inverters in this chain, $d_1$-$d_4$ will consume a correlative power to the same data; thus, along the whole interval ΔT, the power consumption is correlated to the data.

RMT²L Advantages Over RDI

In RMT²L methodology however, the delays are inserted on the clock network (e.g. see FIG. 13) which does not hold any side-channel information on the data, and therefore is not vulnerable to attacks even at the inputs of the module. In addition, the delay implementation for RMT²L units clock-signals consumes much less hardware comparing to RDI (in RDI there is a delay chain for each input and in RMT²L there is only one chain on the clock path), which makes it more energy and area effective.

Method for Protecting Against SCAs

Figure 10:
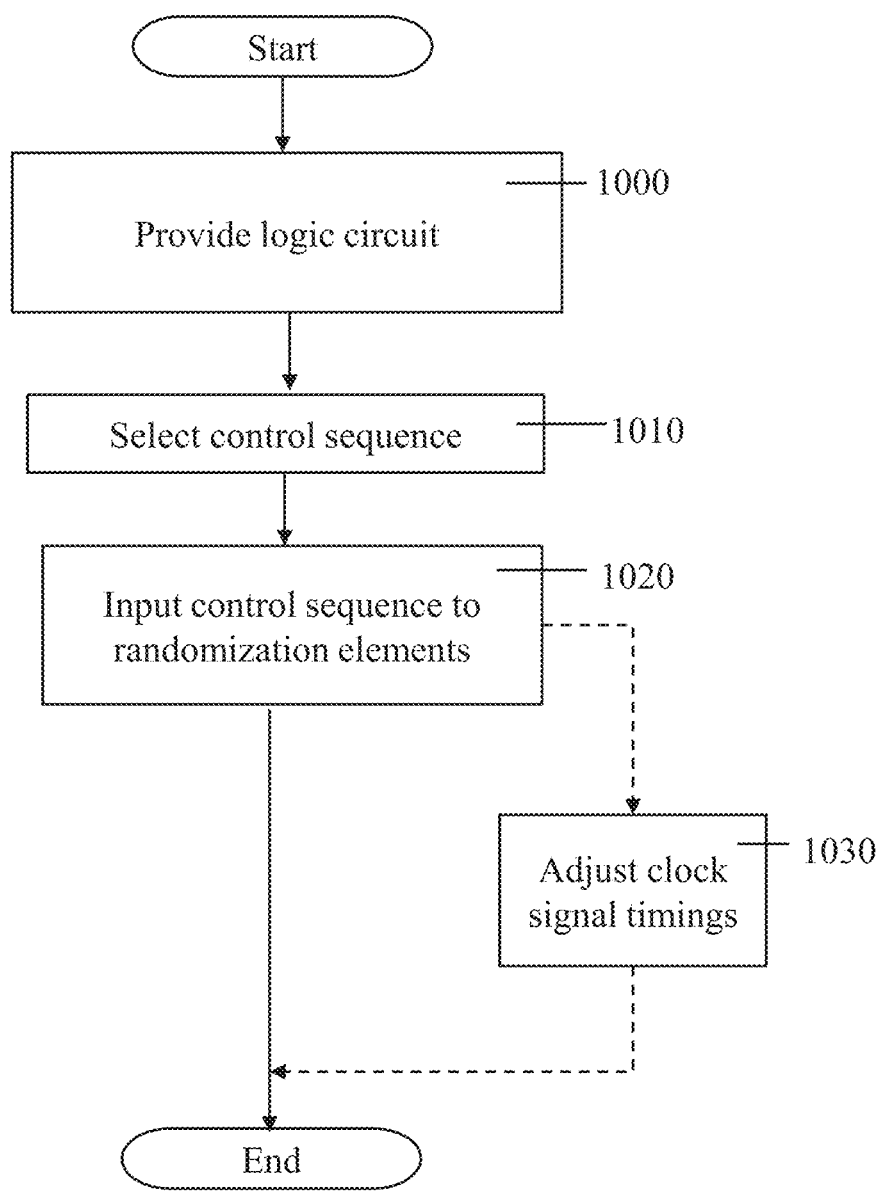
FIG. 10 is a simplified flowchart of a method for combating side channel attacks on a logic circuit, according to embodiments of the invention.

Reference is now made to FIG. 10, which is a simplified flowchart of a method for combating side channel attacks on a logic circuit, according to embodiments of the invention.

In 1000 a logic circuit including logic gates with randomization elements interspersed amongst them is provided. The randomization elements operate as described above, to introduce a delay between a logic output of a respective preceding logic gate and a logic input of a respective following logic gate, and to operate selectably in static mode and in dynamic mode in accordance with a respective mode control signal. The respective delay of each of the randomization elements is controlled by the timing of a respective clock signal. Both the logic circuit and the randomization elements are configured and operate substantially as described above.

In some embodiments, some of the randomization elements operate in precharge mode and others operate in predischarge mode.

In 1010, a sequence of control signals (denoted a control sequence) is selected to shape a logic circuit power profile and logic signal propagation timing during logic circuit operation so as to combat side channel attacks. Optionally, the control sequence is one of a random sequence or a semi-random sequence. Optionally the control sequence includes both mode control and delay control signals. Further optionally, some or all of the delay control signals are respective clock signals for respective randomization elements. In alternate embodiments, the control sequence includes only mode control signals.

In 1020, the control sequence is input to the randomization elements.

In some embodiments, the control sequence is selected to randomize the logic circuit power profile and/or the logic signal propagation timing.

Optionally, selecting the control sequence includes inputting the sequence from an element external to the logic circuit.

Optionally, the clock signals are synchronized.

Optionally in 1030, the relative timing of the clock signals is adjusted to further shape the logic signal propagation timing and/or the logic circuit power profile.

The Randomized Multi Topology and Timing Logic (RMT$^2$L) described herein enhances immunity to DPA/CPA. The RMT$^2$L technique provides high immunity to side-channel attacks by two major approaches: randomization of two topologies, static and dynamic (precharge or predischarge), in any desired location in the crypto-core, and creating different arrival times of the logic paths (propagation delays) to the output. This results in random power profiles and smeared propagation delays of the crypto-chips, preventing the side channel attacks to reveal the stored sensitive data. Simulation results and Matlab data processing of several RMT$^2$L implementation configurations verify a higher immunity to DPA/CPA attacks, as demonstrated below.

It is expected that during the life of a patent maturing from this application many relevant cryptographic devices, cryptographic algorithms, logic gates, randomization elements, static mode logic gates and circuits, dynamic mode logic gates and circuits will be developed and the scope of the terms cryptography, cryptographic device, cryptographic algorithm, logic gate, randomization element, static mode and dynamic mode is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated and simulation support in the following examples.

EXAMPLES

Reference is now made to the following examples, which together with the above descriptions illustrate some embodiments of the invention in a non limiting fashion.

The examples discussed herein demonstrate part the new technique methodology against DPA/CPA attacks, the randomization and locations alternatives are presented through test circuit simulations and data process.

General Description of the Crypto-Core Architecture

Figure 11:
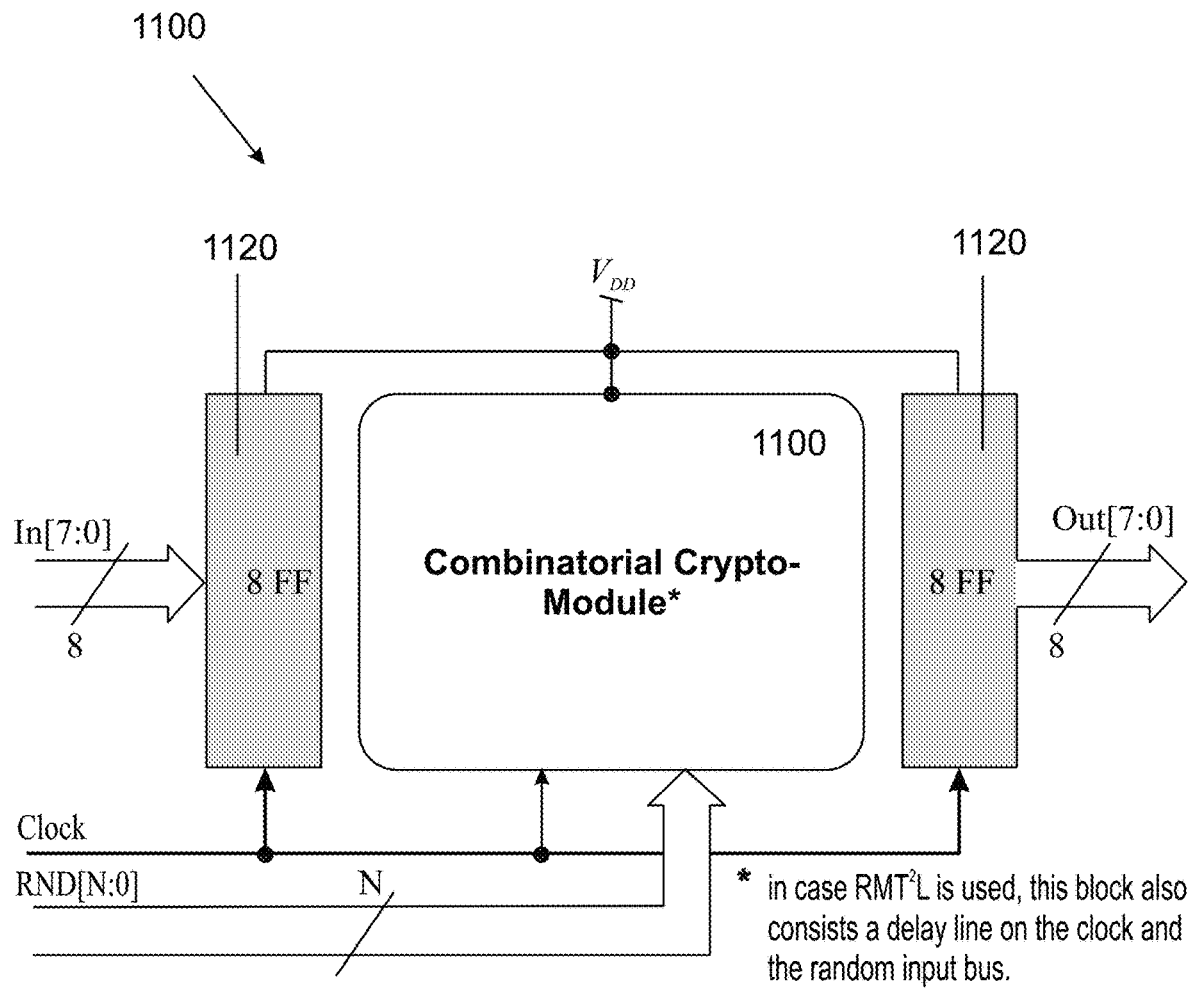
FIG. 11 is a simplified block diagram illustrating Crypto-core architecture.

An exemplary cryptographic module 1100 (also denoted herein a combinational block) is presented in FIG. 11.

The cryptographic module 1100 includes two main blocks; a combinatorial crypto-module 1110 containing the cryptographic logic and RMT$^2$L units, and register arrays 1120 located at the input and output of the combinatorial logic. These blocks are connected to the $V_{DD}$ power domain where the DPA/CPA attacks use it for power traces recording. There are several configurations in which the RMT²L units may be located inside the S-box; a few examples are shown next. The N RND control signals are the N random bits coming externally from a sequence generator, which typically already exists inside crypto cores (e.g., an LFSR module). These signals are connected to the random signals of the RMT²L units (which determines the operated topology of the respective RMT²L units: Static or Dynamic with precharge or predischarge). The modes of operation of the two types of the RMT²L units are summarized in Tables 1 and 2 above.

Combinatorial Logic Description

Figure 12:
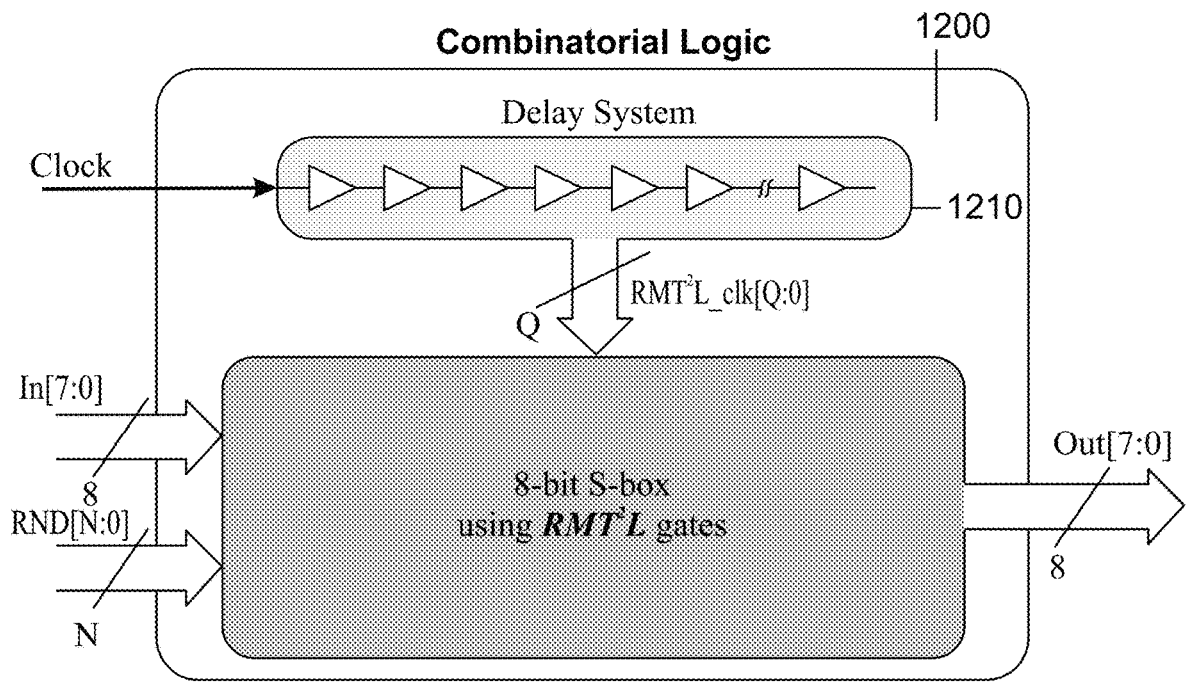
FIG. 12 is a simplified block diagram of a crypto-module utilizing RMT$^2$L, according to embodiments of the invention.

The modified combinatorial logic of a crypto-module 1200 which utilizes the RMT²L concept is illustrated in FIG. 12.

The crypto-module 1200 of FIG. 12 includes a Delay system block 1210 that produces Q different phase clock signals (for the RMT²L units) out of the system clock. The idea is that every RMT²L unit or every group of RMT²L units will receive different clock phases such that the timing of the system signals is smeared over the clock period. As previously mentioned, there are N RND signals fed externally from a sequence generator that are connected to the RMT²L units. The 8-bit S-box with the RMT²L units is the cryptographic module that in addition to its functional operation was added with several RMT²L units in different locations and may change their operation modes on run-time (and thus the system power consumption and timing). The module may eventually work as a regular 8-bit S-box but in a secure way in terms of power attacks.

The Delay System

Figure 13:
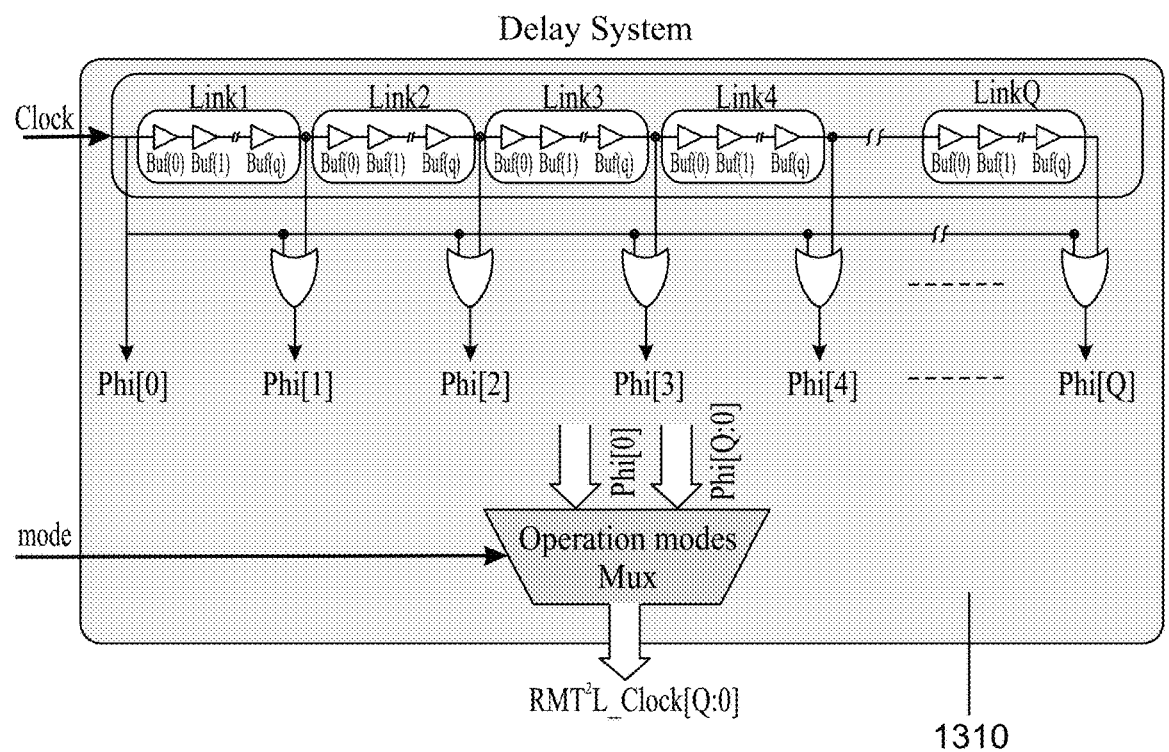
FIG. 13 is a simplified block diagram of a delay system producing Q different phases, according to embodiments of the invention.

The purpose of delay system 1210 is to ensure that the RMT²L units located inside the crypto-core receive their clock signals with different phases. In such a way, in addition to the random power profile of the module, the timing of the different signals is random as well. In order to achieve these different phases but still ensure that the S-box functionality is not damaged, a buffers chain is implemented, divided by Q links, and each link in this chain outputs a shifted clock phase. A specific phase phi [i], i≠0, that feeds an RMT²L unit is obtained by an OR operation between the first phase (which may be the system clock) and the shifted i'th clock phase. In such a way, all RMT²L units enter the precharge period at the same time (e.g., at the rising edge of the system clock), while different RMT²L units may enter the evaluation period at completely different times. This fact may significantly improve the security of the crypto-core by adding random power consumption and smearing the propagation delay paths. This method of delay implementation is a very cost and area effective, for example in comparison to RDI. An example of such Delay system implementation module 1310 producing Q phases is illustrated in FIG. 13.

Figure 16:
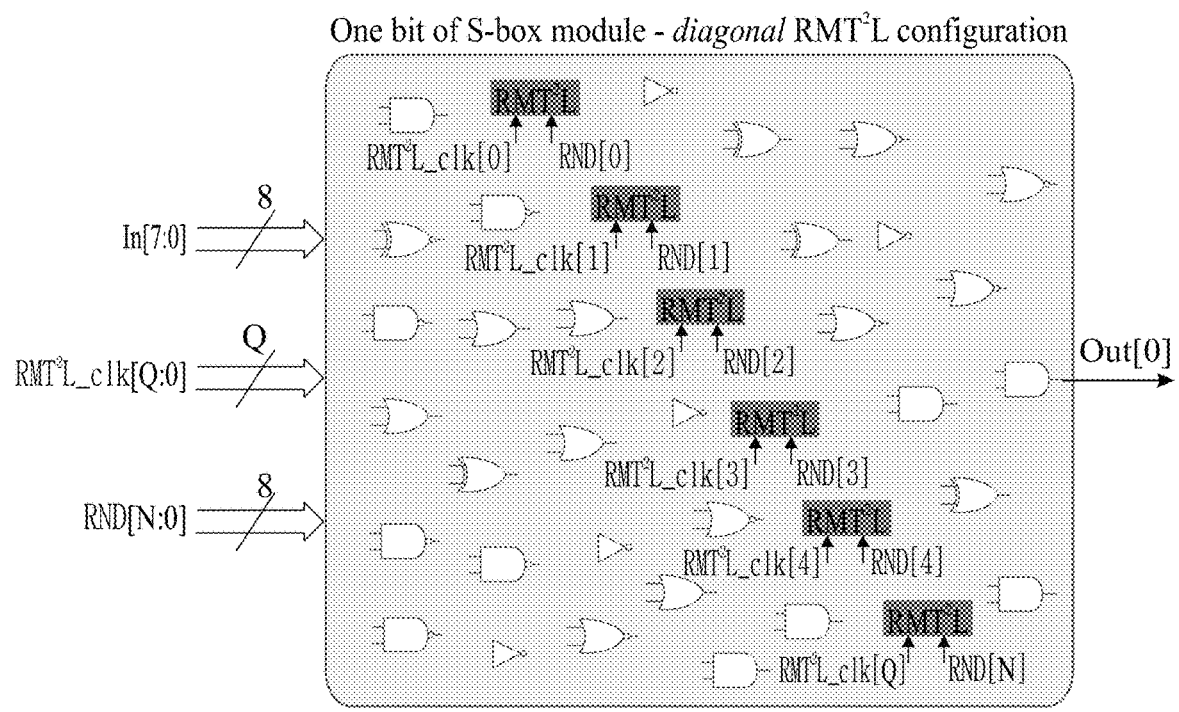
FIG. 16 is a simplified block diagram of a diagonal RMT$^2$L logic circuit configuration, according to embodiments of the invention.
Figure 17:
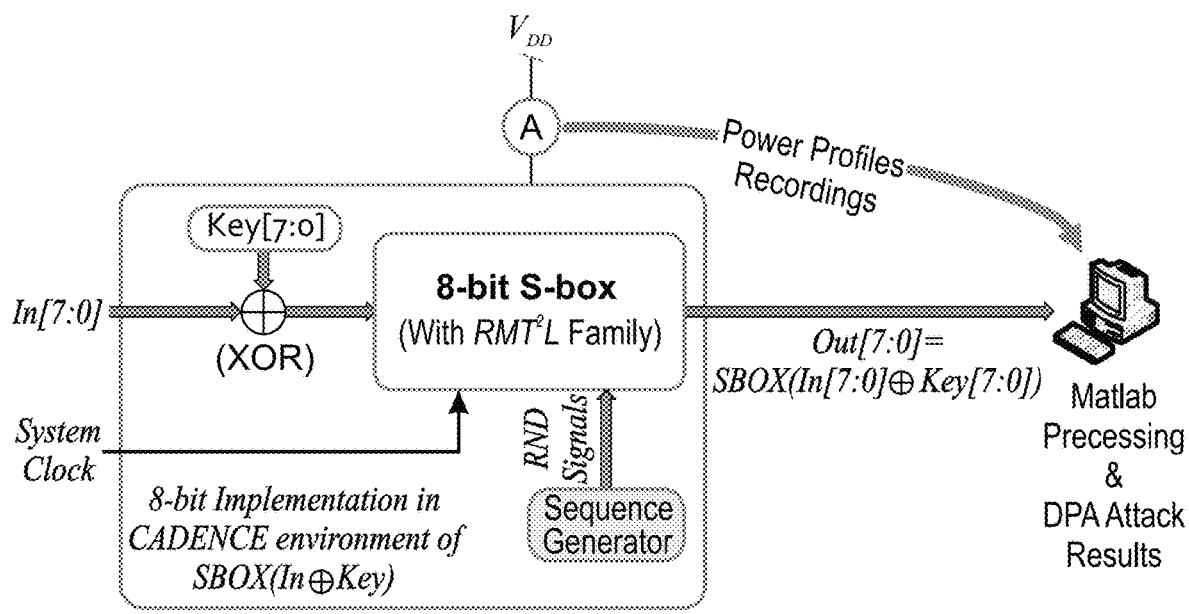
FIG. 17 is a simplified illustration of a DPA/CPA Test Circuit.

Each link in the chain provides a specific time delay T, hence the largest delay phase is around Q×T. The designer may define the connectivity of each RMT²L unit or each group of RMT²L units to these phases. It just needs to be ensured that there is sufficient time for evaluation phases of the dynamic RMT²L units, and that there is no risk for the S-box functionality to be damaged (easily satisfied with standard synthesis tools). Note that in case that the RMT²L units are located randomly inside the crypto-core (or in a diagonal configuration as shown in FIG. 16) in such a way that the physical propagation delays of the paths are sufficient for DPA/CPA immunity, a transparent mode may be configured (by the mode signal) and all RMT²L units receive the system clock (at the same phase).

8-Bit S-Box

Figure 14:
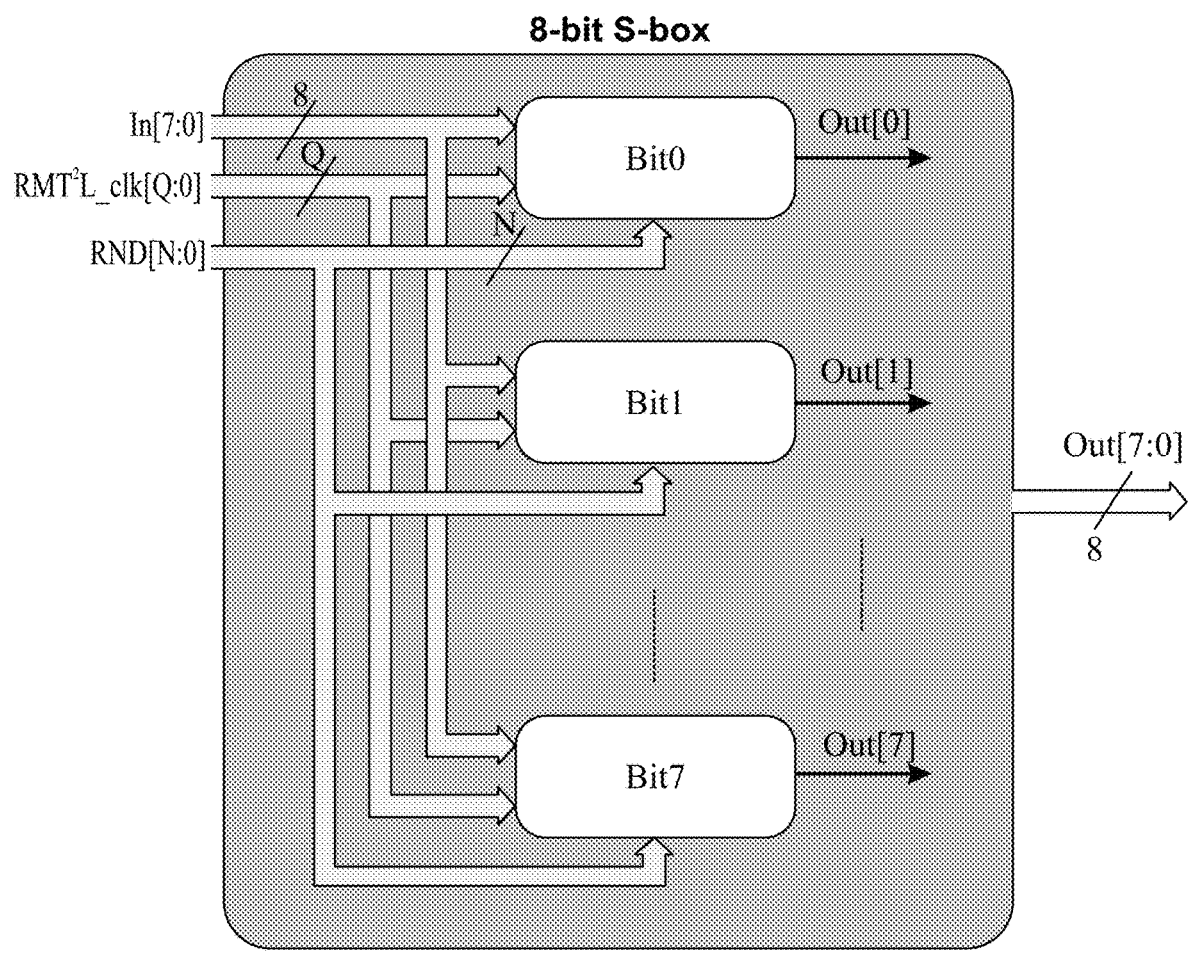
FIG. 14 is a simplified block diagram of an 8-bit S-box with separated bits, according to embodiments of the invention.

The 8-bit S-box is based on the known Look-Up table (taken from the AES standard). It may be implemented in any chosen architecture. In order to prevent multibit attacks the randomization of outputs arrival times and precharge\discharge mechanisms for different outputs should be independent therefore a conceptual easy to understand and "arranged" RMT²L location configurations are presented. Specifically, a sound architecture where no shared logic exists between logical cones is presented; we note such a construction by separated bits. This architecture may be used for achieving minimal number of shared logic gates and clearly it increases the number of gates, area and power consumption however provides high immunity to multibit attacks. Note that this architecture is not compulsory when using RMT²L, however, the less shared logic, the simpler and more effective way to locate the RMT²L units. The separated bits scheme is illustrated in FIG. 14.

Note that after the synthesis of the S-box (for any architecture implemented), the RMT²L units are inserted into the module in the desired location (using simple scriptural manipulations of the netlist).

Examples of S-Box Configurations Using RMT²L Units

In this section we give several examples of one bit of the separated S-box module (bit0), and describe how the logic may be implemented using the RMT²L units planted inside. Of course more than one configuration may be implemented as a combined configuration.

Figure 15:
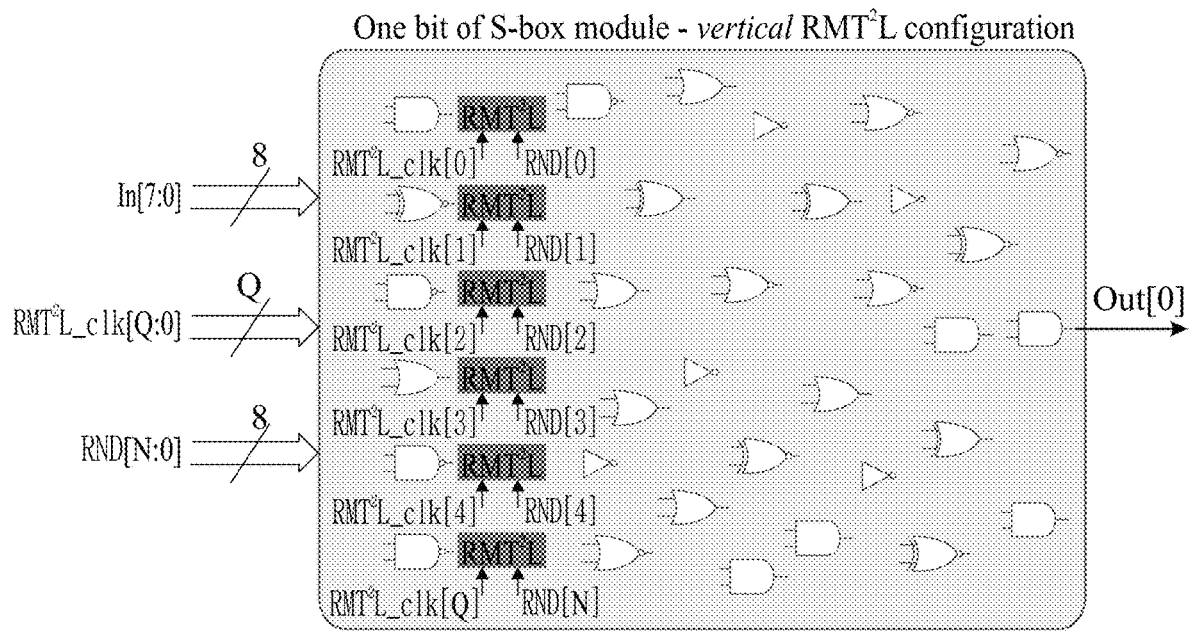
FIG. 15 is a simplified block diagram of a vertical RMT$^2$L logic circuit configuration, according to embodiments of the invention.

One possible configuration is a vertical arrangement of the RMT²L units, as shown in FIG. 15. These units are located in a vertical way close to the entrance of the module, ensuring that every path from the inputs to the output includes (at least) one RMT²L unit. In addition, each RMT²L unit receives different clock phase from the delay system. As a result, this configuration leads a random power profile, as well as random timing to each path.

Another possible configuration option is a diagonal arrangement of the RMT²L units, as shown in FIG. 16. In this configuration we also ensure that every path from the inputs to the output includes (at least) one RMT²L unit. However, in this case the clock signals of the RMT²L units may be the same clock (the same phase) therefore the propagation delay is smeared along most of the clock period. Also in this configuration the power profile, as well as the timing to each path are random.

Yet another possible configuration may include a random arrangement of RMT²L units. Optionally, a crypto-module may be implemented using a combination of several configurations for each bit. For example: vertical and diagonal, random and vertical, random and diagonal, and so forth. Additionally or alternately, different bits of the module may be implemented using different configurations or a different combination of configurations. From a system level point of view, in an AES algorithm implementation (e.g. AES-128) each S-box may consist of different configurations inside or different combinations of several configurations.

Test Setup

A test setup was established for the security evaluation of our proposed RMT²L countermeasure. The test setup used for the DPA/CPA analysis, shown in FIG. 17, includes the device under attack (DUA), the current measurement setup, and the power profile recordings data process (using Matlab). The 8-bit input signal is first XORed with an 8-bit secret key, and then the result propagates to the 8-bit S-box block. The S-box implementation contains the RMT²L units, whereas their RND signals are governed by a sequence generator that produces random sequences (implemented using Cadence's pseudo-random generator or Verilog A).

Simulation Results

Figure 18:
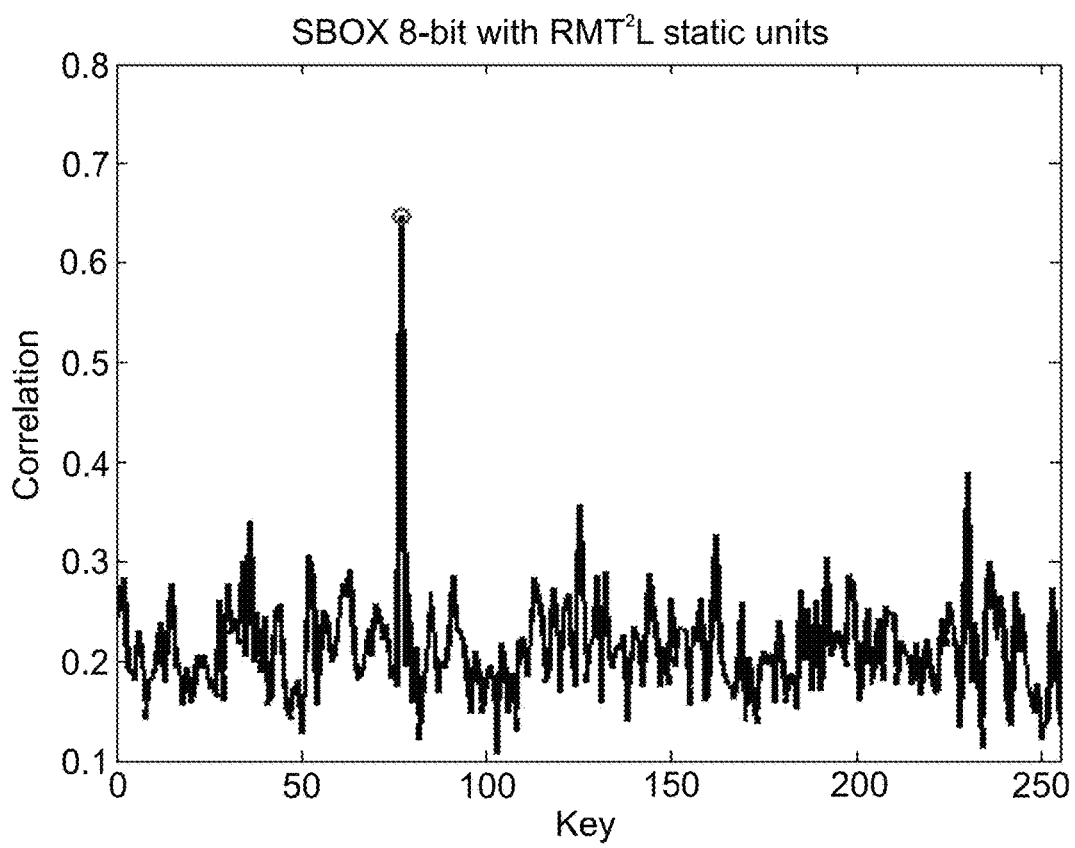
FIG. 18 shows CPA attack simulation results for 8-bit S-box using static RMT$^2$L units.

The first DUA was realized using the static mode of operation (CMOS like). The circuit inputs—In[7:0] were fed by 500 random but known inputs, and the current were recorded to perform CPA attack based on the SNR metric. A multi-bit CPA attack was implemented, shown in FIG. 18. FIG. 18 shows the maximum correlations obtained between the measured current profiles and the processed data, as a function of the guessed key. The attack successfully reveals the secret key arbitrarily set to be $(77)_{10}$, as no countermeasures were adopted.

Using the same test-circuit as described previously, a module with $RMT^2L$ units was evaluated on two configurations, vertical and diagonal. As in the previous test, for the CPA attack process, the current graphs were recorded for the different inputs—In[7:0] fed by 500 random but known inputs. In these cases, CPA attacks were also established for 1000 and 10000 random input vectors for more accurate security evaluation. In this experiment, several different RNG signals were used for the precharge and static topologies, and were inserted to the $RMT^2L$ units of the test-circuit, whereas all the other gates were standard CMOS.

Figure 19:
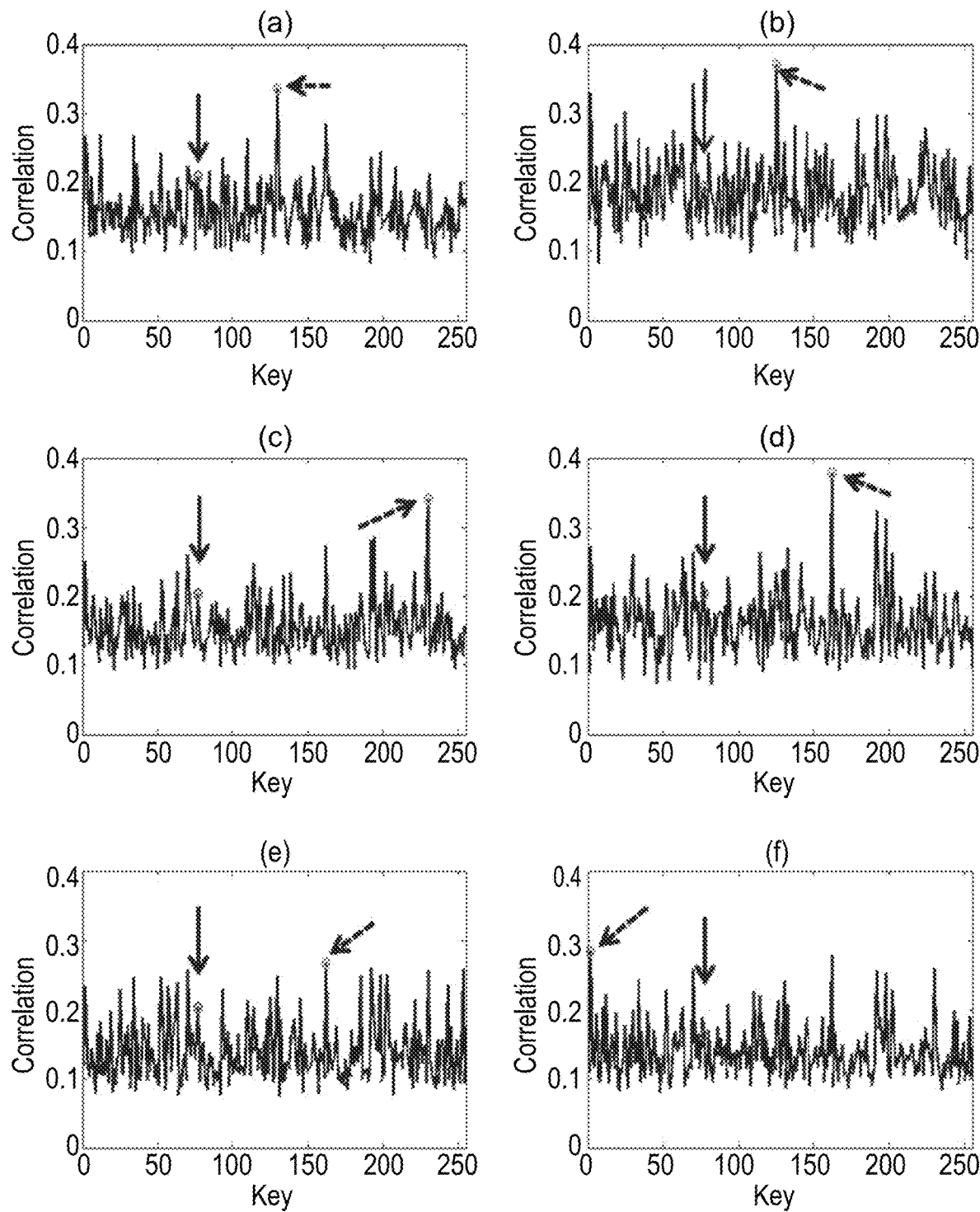
FIG. 19 shows CPA attack simulation results for an 8-bit S-box using RMT$^2$L units.

FIG. 19 presents the maximum correlation results as a function of the key guesses, for the vertical (FIGS. 19a, 19c and 19e) and diagonal (FIGS. 19b, 19d and 19f) configuration implementations. The rows in the figure refer to the number of input vectors inserted to the tested module (500, 1000, and 10000, for top, middle and bottom rows respectively). FIG. 19a shows a vertical configuration with 500 input vectors. FIG. 19b shows a diagonal configuration with 500 input vectors. FIG. 19c shows a vertical configuration with 1000 input vectors. FIG. 19d shows a diagonal configuration with 1000 input vectors. FIG. 19e shows a vertical configuration with 10000 input vectors. FIG. 19f shows a diagonal configuration with 10000 input vectors.

It is seen that by using $RMT^2L$ units the correct key (shown by the solid arrow) cannot be extracted, as other keys have the maximum correlation with the power profiles (shown by the dashed arrow). The correlation between the correct key and the processed data was minimized by randomly changing the $RMT^2L$ topologies, causing random power profiles and random timings.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A randomization element comprising:
    a logic input, configured to input a logic signal;
    a logic output, configured to output said logic signal at a delay; and
    a delay element associated with said logic input and logic output, configured to introduce a delay between said logic input and said logic output, wherein said delay element operates selectably in static mode and in dynamic mode in accordance with a mode control signal,
    wherein said delay element comprises:
    a first two-to-one multiplexer, having a first input connected to a ground signal, a second input connected to a clock signal, an output and a control input connected to said mode control signal; and
    a second two-to-one multiplexer, having a first input connected to said logic input, a second input connected to a reference voltage, an output connected to said logic output and a respective control input connected to said output of said first two-to-one multiplexer,
    wherein said control input of said first two-to-one multiplexer selects between said first and said second inputs of said first two-to-one multiplexer for outputting at said output of said first two-to-one multiplexer, and wherein said control input of said second two-to-one multiplexer selects between said first and said second inputs of said second two-to-one multiplexer for outputting at said output of said second two-to-one multiplexer.

2. The randomization element according to claim 1, wherein during dynamic operation said delay is controlled by a timing of a clock signal.

3. The randomization element according to claim 2, wherein said delay element operates in precharge mode, and a logic level input at said logic input is output at said logic output on a rising edge of said clock signal.

4. The randomization element according to claim 2, wherein said delay element operates in predischarge mode, and a logic level input at said logic input is output at said logic output on a falling edge of said clock signal.

5. The randomization element according to claim 1, further comprising a logic gate configured to perform a logic function, wherein said logic input of said randomization element is connected to a logic output of said logic gate, such that said logic gate and said randomization element operate in tandem to provide said logic function in static or dynamic mode in accordance with said mode control signal and with a timing controlled by said mode control signal and a clock signal.

6. The randomization element according to claim 1, wherein during dynamic operation said delay is controlled by a timing of said clock signal.

7. The randomization element according to claim 1, wherein during static operation said delay element minimizes a propagation delay of said logic signal through said randomization element.

8. A logic circuit, comprising:
    a plurality of logic gates;
    a plurality of randomization elements interspersed between said logic gates, each of said randomization elements being configured to introduce a delay between a logic output of a respective preceding logic gate and a logic input of a respective following logic gate, wherein each of said randomization elements operates selectably in static mode and in dynamic mode in accordance with a respective mode control signal; and
    a control sequence provider associated with said randomization elements, configured to provide sequences of control signals to said randomization elements, wherein said sequences are selected to shape a logic circuit power profile and logic signal propagation timing during logic circuit operation, so as to combat side channel attacks, wherein at least one of said randomization elements comprises:

a first two-to-one multiplexer, having a first input connected to a ground signal, a second input connected to a clock signal, an output and a control input connected to said mode control signal; and a second two-to-one multiplexer, having a first input connected to a logic output of a preceding logic gate, a second input connected to a reference voltage, an output connected to a logic input of a following logic gate, and a respective control input connected to said output of said first two-to-one multiplexer, wherein said control input of aid first two-to-one multiplexer selects between said first and said second inputs of said first two-to-one multiplexer for outputting at said output of said first two-to-one multiplexer, and wherein said control input of said second two-to-one multiplexer selects between said first and said second inputs of said second two-to-one multiplexer for outputting at said output of said second two-to-one multiplexer.

9. The logic circuit according to claim 8, wherein some of said randomization elements are configured to operate in precharge mode and others of said randomization elements are configured to operate in predischarge mode.

10. The logic circuit according to claim 8, wherein a respective delay of each of said randomization elements is controlled by a timing of a respective clock signal.

11. The logic circuit according to claim 10, wherein when a randomization element operates in precharge mode a logic level obtained from a logic output of a preceding logic gate is provided to said a logic input of a following logic gate on a rising edge of a respective clock signal.

12. The logic circuit according to claim 10, wherein when a randomization element operates in precharge mode a logic level obtained from a logic output of a preceding logic gate is provided to a logic input of a following logic gate on a falling edge of a respective clock signal.

13. The logic circuit according to claim 8, wherein for at least one randomization element of said randomization elements, an input of the at least one randomization element is connected to a logic output of a logic gate performing a respective logic function, such that said logic gate and the at least one randomization element operate in tandem to provide said logic function in static or dynamic mode in accordance with a respective mode control signal and with a delay controlled by a respective delay control signal.

14. The logic circuit according to claim 13, wherein said respective delay control signal comprises a clock signal.

15. The logic circuit according to claim 8, wherein said control sequence provider is configured to generate said sequences of control signals.

16. The logic circuit according to claim 8, wherein said sequences of control signals comprise random sequences.

17. The logic circuit according to claim 8, wherein said sequences of control signals are input from an external device through a control sequence input connection.

18. A method for combating side channel attacks on a logic circuit, comprising:

providing a logic circuit, wherein said logic circuit comprises:
a plurality of logic gates; and
a plurality of randomization elements interspersed between said logic gates, each of said randomization elements introducing a delay between a logic output of a respective preceding logic gate and a logic input of a respective following logic gate, wherein each of said randomization elements operates selectably in static mode and in dynamic mode in accordance with a respective control signal and wherein a respective delay of each of said randomization elements is controlled by a timing of a respective clock signal;

selecting a sequence of control signals to shape a logic circuit power profile and logic signal propagation timing during logic circuit operation so as to combat side channel attacks; and inputting said sequence of control signals to said randomization elements, wherein at least one of said randomization elements comprises:

a first two-to-one multiplexer, having a first input connected to a ground signal, a second input connected to a respective clock signal, an output and a control input connected to a respective control signal; and a second two-to-one multiplexer, having a first input connected to a logic output of a respective preceding logic gate, a second input connected to a reference voltage, an output connected to a logic input of a respective following logic gate, and a control input connected to said output of said first two-to-one multiplexer, wherein said control input of said first two-to-one multiplexer selects between said first and said second inputs of said first two-to-one multiplexer for outputting at said output of said first two-to-one multiplexer, and wherein said control input of said second two-to-one multiplexer selects between said first and said second inputs of said second two-to-one multiplexer for outputting at said output of said second two-to-one multiplexer.

19. The method according to claim 18, wherein said sequence of control signals is selected to randomize said logic circuit power profile and/or said logic signal propagation timing.

20. The method according to claim 18, wherein some of said randomization elements are configured to operate in precharge mode and others of said randomization elements are configured to operate in predischarge mode.

21. The method according to claim 18, wherein respective clock signals are synchronized.

22. The method according to claim 18, further comprising adjusting a relative timing of clock signals to further shape said logic signal propagation timing and/or said logic circuit power profile.

23. The method according to claim 18, wherein the selecting a sequence of control signals comprises inputting said sequence from an element external to said logic circuit.

24. The method according to claim 18, wherein said sequence is one of: a random sequence and a semi-random sequence.

* * * * *

UNITED STATES PATENT AND TRADEMARK OFFICE
CERTIFICATE OF CORRECTION

PATENT NO. : 10,951,391 B2
APPLICATION NO. : 15/757658
DATED : March 16, 2021
INVENTOR(S) : Moshe Avital et al.

It is certified that error appears in the above-identified patent and that said Letters Patent is hereby corrected as shown below:

On the Title Page

Item (73) Assignee,
After "Bar-Ilan University" insert the following: -- Ramat-Gan (IL) --

Signed and Sealed this
Second Day of August, 2022

Katherine Kelly Vidal
*Director of the United States Patent and Trademark Office*